United States Patent
Mani et al.

(10) Patent No.: US 11,412,077 B2
(45) Date of Patent: Aug. 9, 2022

(54) MULTI-LOGICAL-PORT DATA TRAFFIC STREAM PRESERVATION SYSTEM

(71) Applicant: Dell Products L.P., Round Rock, TX (US)

(72) Inventors: Dinesh Kumar Mani, Bangalore (IN); Amitabh Jawahar Abraham, Bangalore (IN); Shradha Ambani, Chennai (IN)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 17/063,798

(22) Filed: Oct. 6, 2020

(65) Prior Publication Data

US 2022/0109747 A1    Apr. 7, 2022

(51) Int. Cl.
*H04L 69/323* (2022.01)
*H04L 49/55* (2022.01)
*H04L 49/253* (2022.01)
*H04L 69/324* (2022.01)

(52) U.S. Cl.
CPC .......... *H04L 69/323* (2013.01); *H04L 49/254* (2013.01); *H04L 49/557* (2013.01); *H04L 69/324* (2013.01)

(58) Field of Classification Search
CPC ... H04L 69/323; H04L 49/254; H04L 49/557; H04L 69/324; G06F 2009/45587
See application file for complete search history.

(56) References Cited

U.S. PATENT DOCUMENTS

| | | | | |
|---|---|---|---|---|
| 7,936,770 B1 * | 5/2011 | Frattura | .................. | H04L 49/90 370/412 |
| 10,476,699 B2 * | 11/2019 | Sudhakaran | ........ | H04L 41/0806 |
| 10,862,816 B2 * | 12/2020 | Brar | ........................ | H04L 67/34 |
| 10,944,691 B1 * | 3/2021 | Raut | ....................... | H04L 47/82 |
| 11,165,716 B2 * | 11/2021 | Song | .................. | H04L 47/2475 |

\* cited by examiner

*Primary Examiner* — Chandrahas B Patel
(74) *Attorney, Agent, or Firm* — Joseph Mencher

(57) ABSTRACT

A multi-logical port data traffic stream preservation system includes a networking device coupled to a computing device via its physical port, a first networking fabric via a first uplink, and a second networking fabric via a second uplink. The networking device receives communications from the computing device that identify first and second logical ports provided using the physical port on the computing device, a first data traffic type associated with the first networking fabric and transmitted on the first logical port, and a second data traffic type associated with the second networking fabric and transmitted on the second logical port. If the first uplink becomes unavailable, the networking device transmits a communication to the computing device that causes the computing device to stop transmitting the first data traffic type via the first logical port while continuing to transmit the second data traffic type via the second logical port.

20 Claims, 19 Drawing Sheets

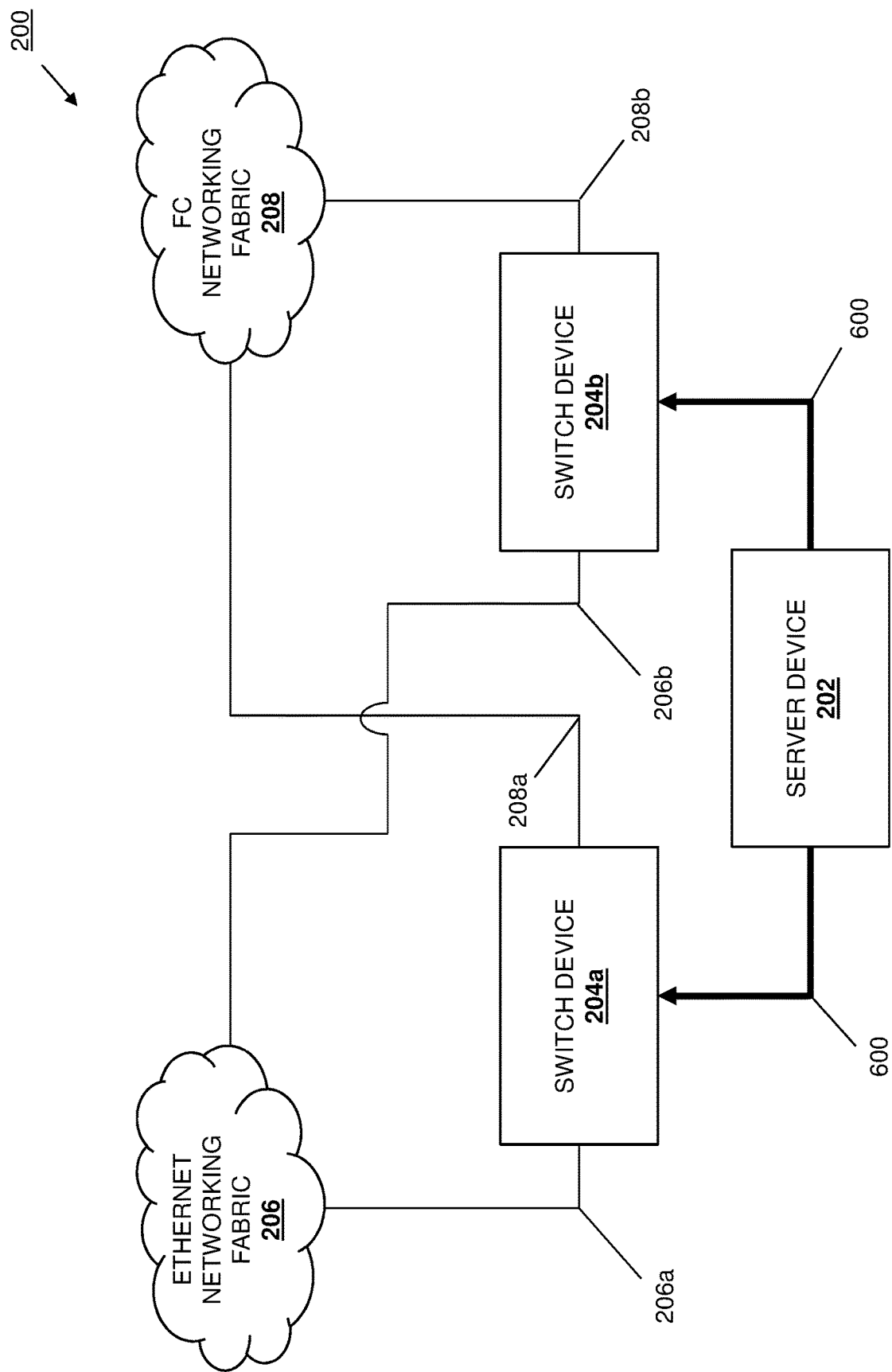

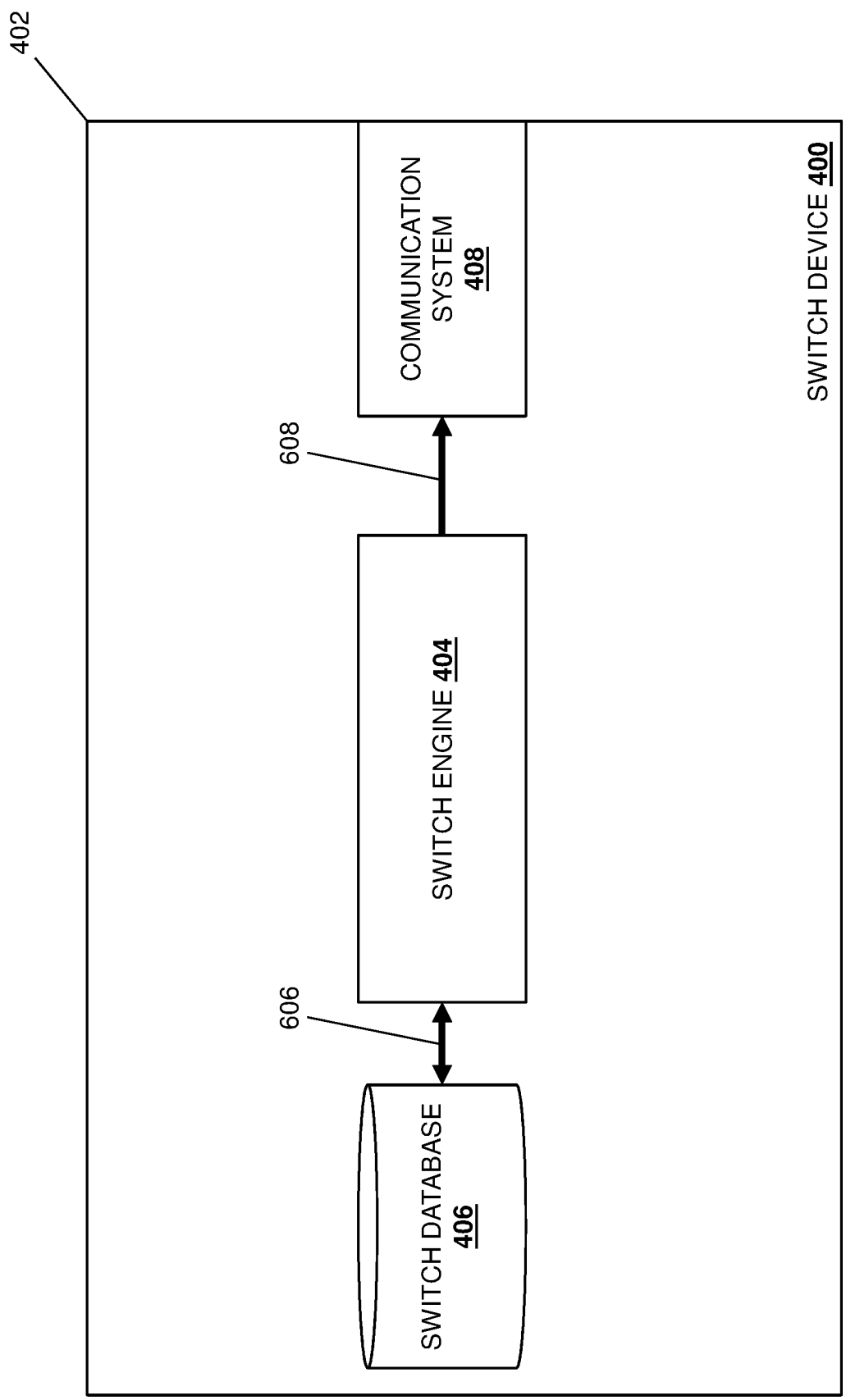

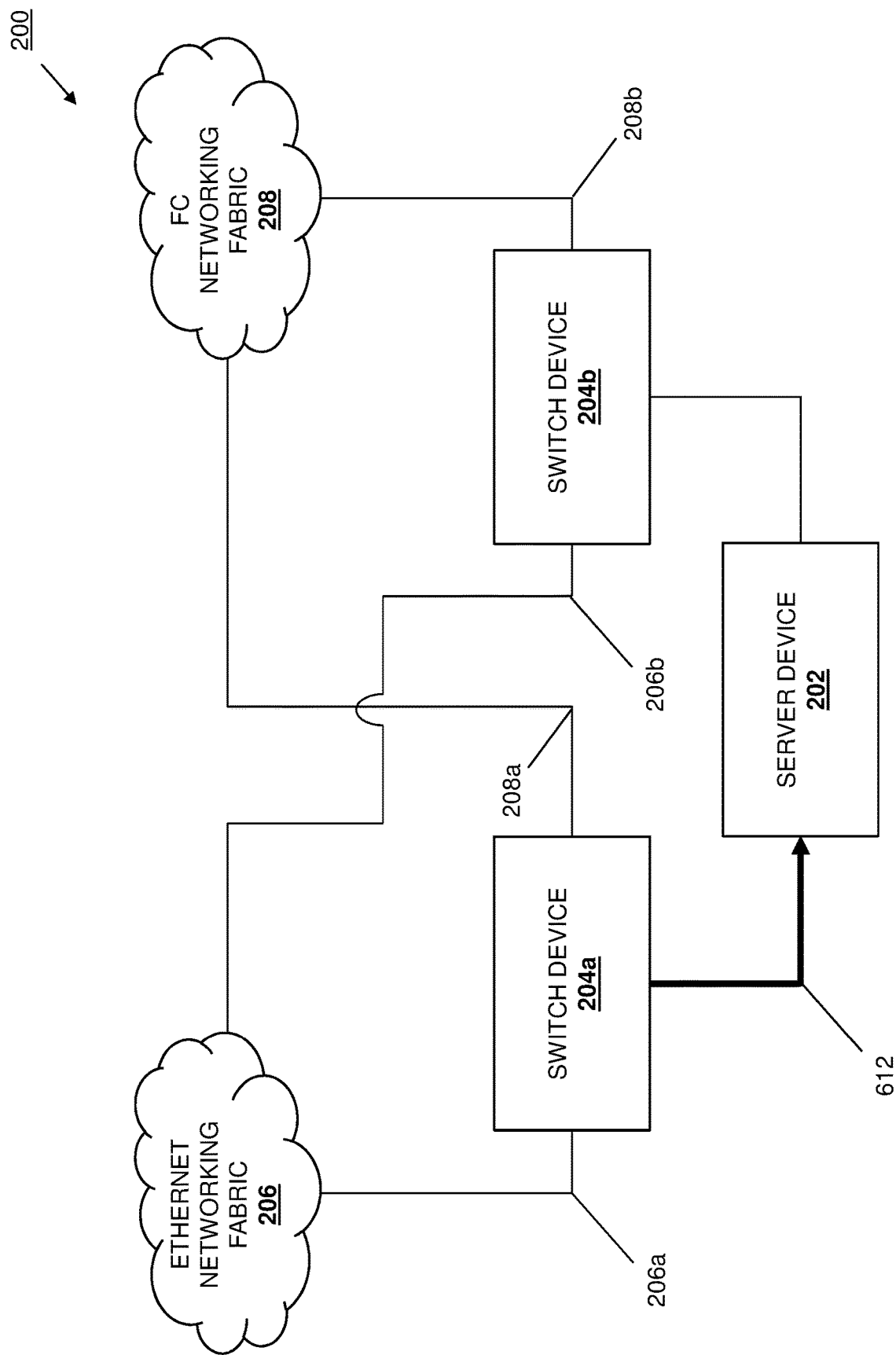

MULTI-LOGICAL-PORT DATA TRAFFIC STREAM PRESERVATION SYSTEM

BACKGROUND

The present disclosure relates generally to information handling systems, and more particularly to preserving a data traffic stream on at least one logical port included in a plurality of logical ports provided by an information handling system when an uplink associated with at least one other logical port included in the plurality of logical ports becomes unavailable.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes utilize multiple logical ports on a single physical port in order to transmit different data traffic streams via a switch device to different networking fabrics. For example, server devices may be connected to a switch device, with that switch device connected to an Ethernet networking fabric and a Fibre Channel networking fabric. In such situations, a Network Interface Controller (NIC) in a converged network adapter device provided in the server device may be partitioned such that a server physical port on the NIC/converged network adapter device is configured with a logical Ethernet port for use in transmitting Ethernet data traffic to the switch device for forwarding to the Ethernet networking fabric, as well as configured with a logical Fibre Channel port for use in transmitting Fibre Channel data traffic (e.g., Fibre Channel over Ethernet (FCoE) data traffic) to the switch device for forwarding to the Fibre Channel networking fabric. However, the use of the such logical ports can raise some issues as, at the switch device level, conventional systems do not discriminate between data traffic flowing through the server physical port upon which the logical ports are provided.

For example, as discussed above, the server device may transmit Ethernet data traffic to the switch device via the logical Ethernet port provided by its server physical port, and may transmit Fibre Channel data traffic to the switch device via the logical Fibre Channel port provided by that server physical port, with the switch device receiving those data traffic streams via a switch physical port, forwarding the Ethernet data traffic to the Ethernet networking fabric via an Ethernet networking fabric uplink on the switch device, and forwarding the Fibre Channel data traffic to the Fibre Channel networking fabric via a Fibre Channel networking fabric uplink (e.g., an FCoE networking fabric uplink) on the switch device. Conventional systems like that described above may utilize Upstream Failure Detection (UFD) subsystems that provide, in the event the Ethernet networking fabric uplink or Fibre Channel (or FCoE) networking fabric uplink become unavailable, for the shutting down of the switch physical port on the switch device that receives Ethernet data traffic and Fibre Channel data traffic via the logical Ethernet port and logical Fibre Channel port provided on the server physical port on the server device. As will be appreciated by one of skill in the art, conventional UFD subsystems do not discriminate between the data traffic being transmitted over the server physical port using its logical ports, and thus the unavailability of the Ethernet networking fabric uplink will result in the inability to transmit Fibre Channel data traffic from the server device to the Fiber Channel networking fabric (even when the Fibre Channel networking fabric uplink is available), while the unavailability of the Fibre Channel networking fabric uplink will result in the inability to transmit Ethernet data traffic from the server device to the Ethernet networking fabric (even when the Ethernet networking fabric uplink is available), which wastes available bandwidth between the server device and at least one networking fabric.

Accordingly, it would be desirable to provide a multi-logical-port data traffic stream preservation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a networking engine that is configured to: receive, from a computing device via a physical port on the computing device, a first logical port identification communication that identifies a first logical port provided using the physical port on the computing device and a first data traffic type associated with a first networking fabric that is accessible to the processing system via a first networking fabric communication link; receive, from the computing device via the physical port on the computing device, a second logical port identification communication that identifies a second logical port provided using the physical port on the computing device and a second data traffic type associated with the second networking fabric that is accessible to the processing system via a second networking fabric communication link; determine that the first networking fabric communication link has become unavailable; and transmit, in response to determining that the first networking fabric communication link has become unavailable, a first logical port disable communication to the computing device that is configured to cause the computing device to stop transmitting first data traffic having the first data traffic type via the first logical port while continuing to transmit second data traffic having the second data traffic type via the second logical port.

BRIEF DESCRIPTION OF THE DRAWINGS

FIG. 6B is a schematic view illustrating an embodiment of the multi-logical port data traffic stream preservation system of FIG. 2 operating during the method of FIG. 5.

FIG. 6F is a schematic view illustrating an embodiment of the switch device of Fig. e operating during the method of FIG. 5.

FIG. 6L is a schematic view illustrating an embodiment of the multi-logical port data traffic stream preservation system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
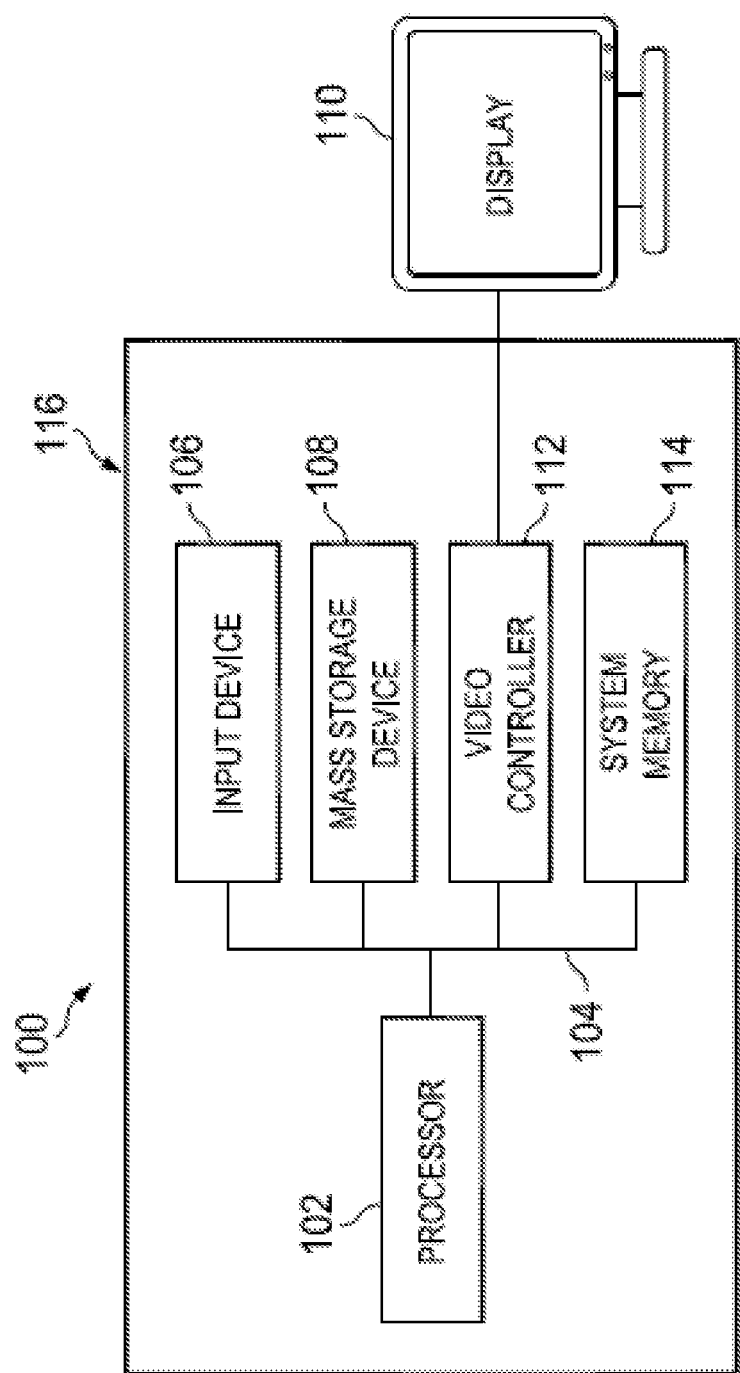
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
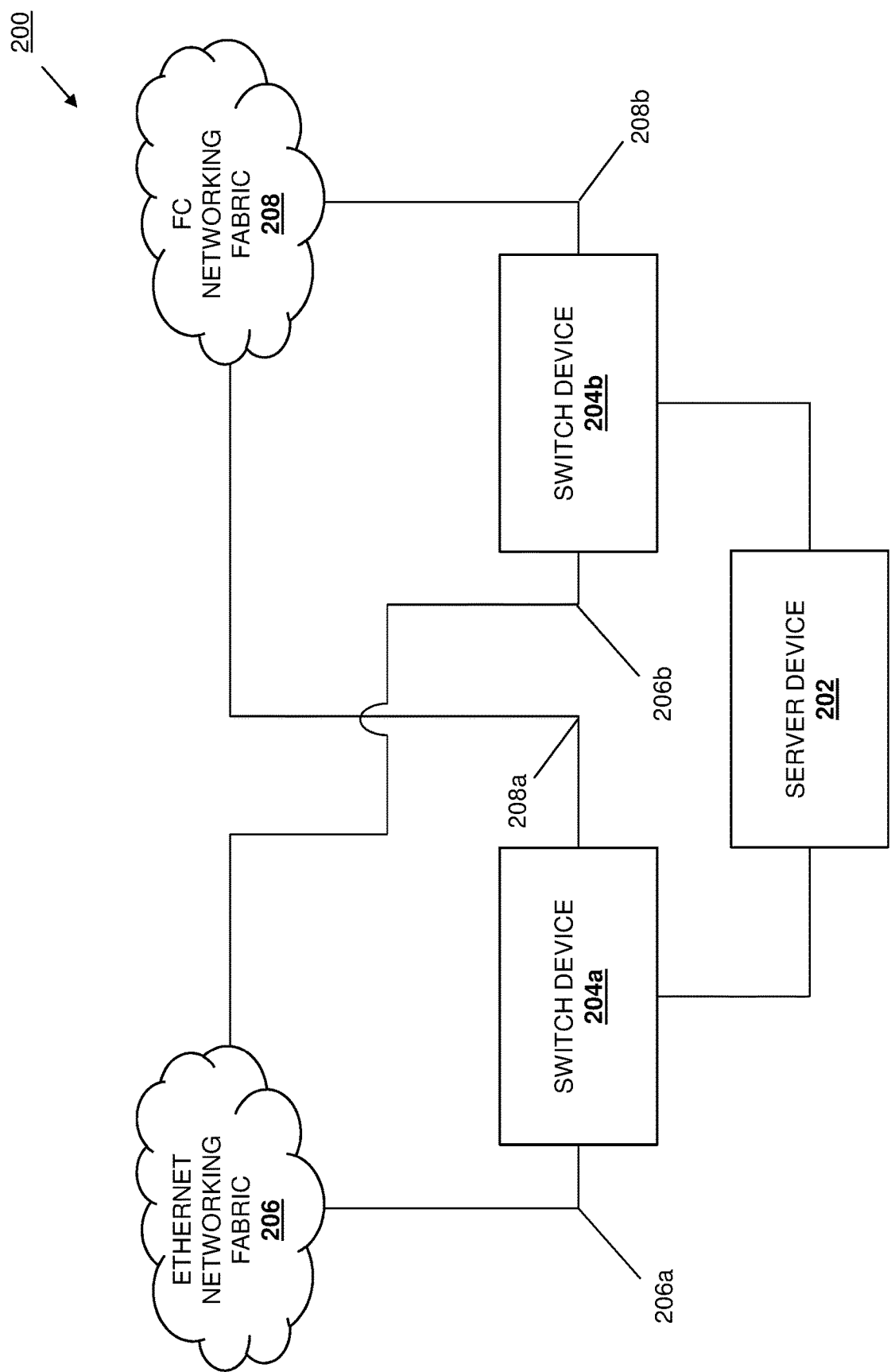
FIG. 2 is a schematic view illustrating an embodiment of multi-logical port data traffic stream preservation system.

Referring now to FIG. 2, an embodiment of a multi-logical port data traffic stream preservation system 200 is illustrated. In the illustrated embodiment, the multi-logical port data traffic stream preservation system 200 includes a server device 202. In an embodiment, the server device 202 may be provided by the IHS 100 discussed above with reference to FIG. 1, and/or may include some or all of the components of the IHS 100. However, while illustrated and discussed as being provided by a server device 202, one of skill in the art in possession of the present disclosure will recognize that the server device 202 provided in the multi-logical port data traffic stream preservation system 200 may include any of a variety of computing devices that may be configured to operate similarly as the server device 202 discussed below.

In the illustrated embodiment, the multi-logical port data traffic stream preservation system 200 also includes a pair of switch devices 204a and 204b that are each coupled to the server device 202. In an embodiment, each of the switch devices 204a and 204b may be provided by the IHS 100 discussed above with reference to FIG. 1, and/or may include some or all of the components of the IHS 100. However, while illustrated and discussed as being provided by switch devices, one of skill in the art in possession of the present disclosure will recognize that the switch devices 204a and 204b provided in the multi-logical port data traffic stream preservation system 200 may include any of a variety of networking devices that may be configured to operate similarly as the switch devices 204a and 204b discussed below. Furthermore, while the embodiments illustrated and discussed below include a pair of redundant switch devices 204a and 204b coupled to the server device 202, one of skill in the art in possession of the present disclosure will recognize that only a single switch device operating according to the teachings of the present disclosure (e.g., the switch device 204a discussed below) may be coupled to the switch device 202 while remaining within the scope of the present disclosure as well.

In the illustrated embodiment, the multi-logical port data traffic stream preservation system 200 also includes a plurality of networking fabrics, which of which is coupled to each of the switch devices 204a and 204b, and that are illustrated in FIG. 2 as an Ethernet networking fabric 206 that is coupled to each of the switch devices 204a and 204b via respective Ethernet networking fabric communication links 206a and 206b(e.g., communication uplinks), and a Fibre Channel (FC) networking fabric 208 that is coupled to each of the switch devices 204a and 204b via respective FC networking fabric communication links 208a and 208b (e.g., communication uplinks). However, while two specific networking fabrics are illustrated and described for the purposes of the simplified examples described below, one of skill in the art in possession of the present disclosure will appreciate that a variety of other networking fabrics (e.g., a management networking fabric, an Internet Small Computer Systems Interface (iSCSI) networking fabric, etc.) may be provided in the multi-logical port data traffic stream preservation system 200 while remaining within the scope of the present disclosure as well. Thus, while a specific multi-logical port data traffic stream preservation system 200 has been illustrated and described, one of skill in the art in possession of the present disclosure will recognize that the multi-logical port data traffic stream preservation system of the present disclosure may include a variety of components and component configurations while remaining within the scope of the present disclosure as well.

Figure 3:
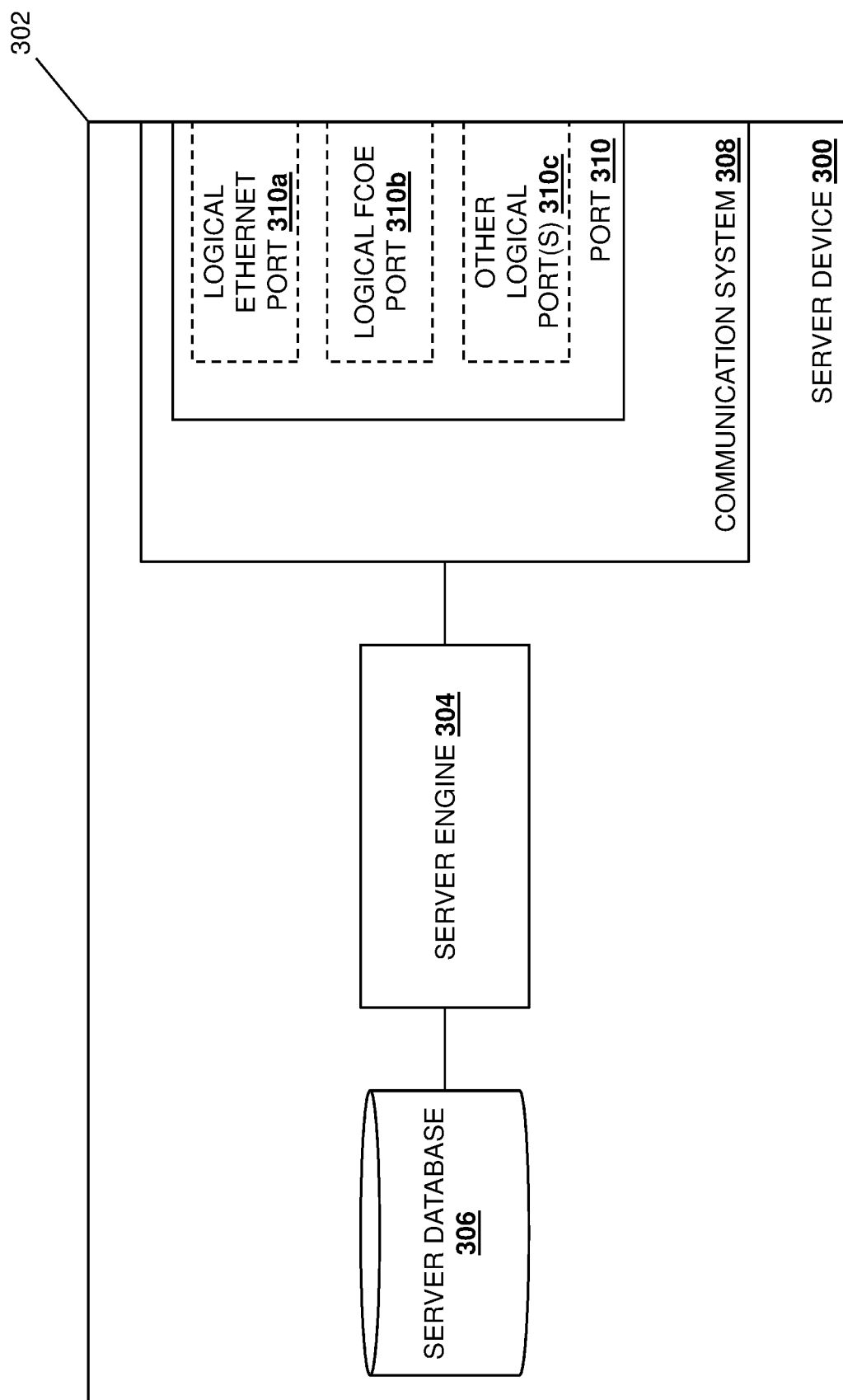
FIG. 3 is a schematic view illustrating an embodiment of a server device that may be included in the multi-logical port data traffic stream preservation system.

Referring now to FIG. 3, an embodiment of a server device 300 is illustrated that may provide the server device 202 discussed above with reference to FIG. 2. As such, the server device 300 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the server device 300 discussed below may be provided by other computing devices that are configured to operate similarly as the server device 300 discussed below. In the illustrated embodiment, the server device 300 includes a chassis 302 that houses the components of the server device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a server engine 304 that is configured to perform the functionality of the server engines and/or server devices discussed below.

The chassis 302 may also house a storage system (not illustrated, but which may include the storage 108 discussed above with reference to FIG. 1) that is coupled to the server engine 304 (e.g., via a coupling between the storage system and the processing system) and that includes a server database 306 that is configured to store any of the information utilized by the server engine 304 discussed below. The chassis 302 may also house a communication system 308 that is coupled to the server engine 304 (e.g., via a coupling between the communication system 308 and the processing system) and that, in the specific examples below is provided by a Converged Network Adapter (CNA) device including a Network Interface Controller (NIC) device, but that one of skill in the art in possession of the present disclosure will recognize may include wireless communication systems (e.g., BLUETOOTH®, Near Field Communication (NFC) components, WiFi components, etc.), and/or any other communication components known in the art.

As illustrated, the communication system 308 may include a port 310 that, as discussed below, is provided by a physical/hardware port, and that may be configured along with the server engine 304 to provide logical ports (e.g., logically partitioned ports) such as, for example, the logical Ethernet port 310a, the logical Fibre Channel over Ethernet (FCoE) port 310b, and/or one or more other logical ports 310c such as, for example, logical management ports, logical iSCSI ports, and/or other logical ports that would be apparent to one of skill in the art in possession of the present disclosure. As will be appreciated by one of skill in the art in possession of the present disclosure, logical ports may be configured on physical port hardware such that those logical ports are "visible" and the operating system may classify data traffic streams over those logical ports. However, while a specific server device 300 has been illustrated and described, one of skill in the art in possession of the present disclosure will recognize that server devices (or other computing devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
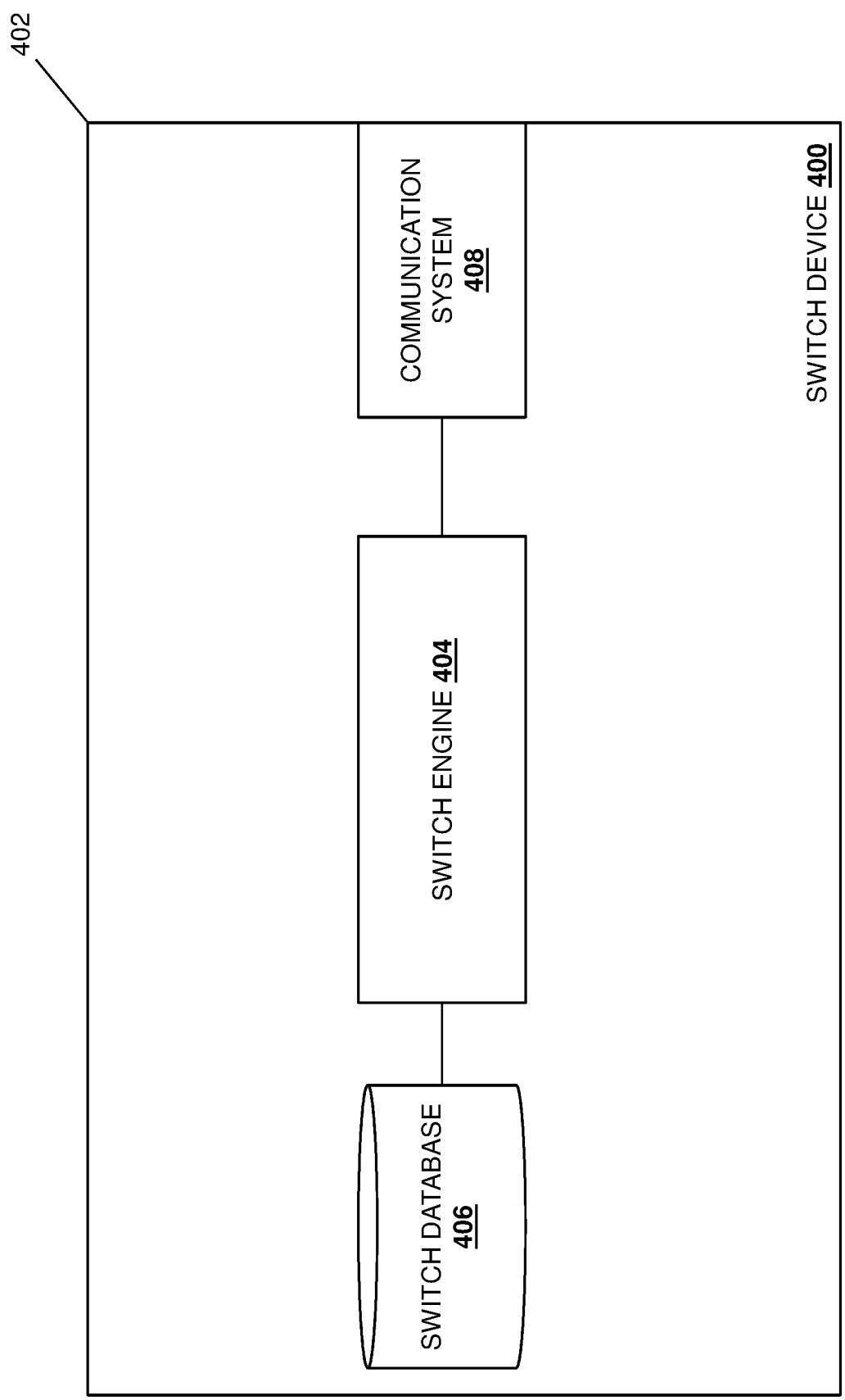
FIG. 4 is a schematic view illustrating an embodiment of a switch device that may be included in the multi-logical port data traffic stream preservation system.

Referring now to FIG. 4, an embodiment of a switch device 400 is illustrated that may provide either or both of the switch devices 204a and 204b discussed above with reference to FIG. 2. As such, the switch device 400 may be provided by the IHS 100 discussed above with reference to FIG. 1 and/or may include some or all of the components of the IHS 100. Furthermore, while illustrated and discussed as being provided by a switch device, one of skill in the art in possession of the present disclosure will recognize that the functionality of the switch device 400 discussed below may be provided by other networking devices that are configured to operate similarly as the switch device 400 discussed below. In the illustrated embodiment, the switch device 400 includes a chassis 402 that houses the components of the switch device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switch engine 404 that is configured to perform the functionality of the switch engines and/or switch devices discussed below.

The chassis 402 may also house a storage system (not illustrated, but which may include the storage 108 discussed above with reference to FIG. 1) that is coupled to the switch engine 404 (e.g., via a coupling between the storage system and the processing system) and that includes a switch database 406 that is configured to store any of the information utilized by the switch engine 404 discussed below. The chassis 402 may also house a communication system 408 that is coupled to the switch engine 404 (e.g., via a coupling between the communication system 308 and the processing system) and that may include a Network Interface Controller (NIC), wireless communication systems (e.g., BLUETOOTH®, Near Field Communication (NFC) components, WiFi components, etc.), and/or any other communication components known in the art. For example, the communication system 408 may include a physical/hardware port that is configured to couple (e.g., via an Ethernet cable) to the port 310 in the communication system 308 on the server device 202/300 discussed above. However, while a specific switch device 400 has been illustrated and described, one of skill in the art in possession of the present disclosure will recognize that switch devices (or other networking devices operating according to the teachings of the present disclosure in a manner similar to that described below for the switch device 400) may include a variety of components and/or component configurations for providing conventional switch device functionality, as well as the functionality discussed below, while remaining within the scope of the present disclosure as well.

Figure 5:
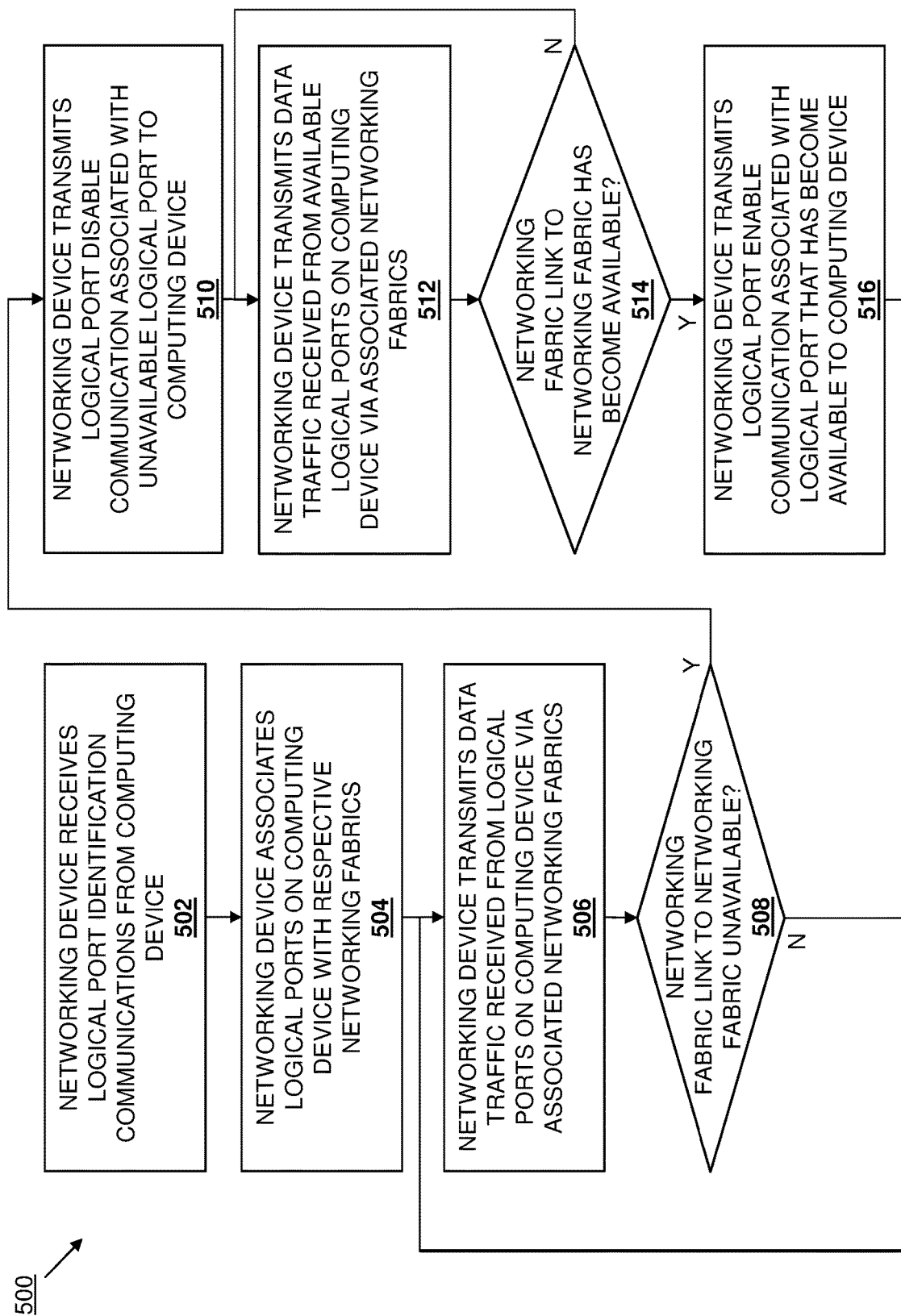
FIG. 5 is a flow chart illustrating an embodiment of a method for preserving data traffic streams on at least one of a plurality of logical ports.

Referring now to FIG. 5, an embodiment of a method 500 for preserving data traffic streams on at least one of a plurality of logical ports is illustrated. As discussed below, the systems and methods of the present disclosure provide for the preservation of data traffic streams received via logical ports provided by a physical port on a computing device and transmitted over respective networking fabrics when the networking fabric communication link to one or more of the networking fabrics becomes unavailable. For example, the multi-logical port data traffic stream preservation system of the present disclosure includes a networking device coupled to a computing device via a physical port on that computing device, a first networking fabric via a first uplink with the networking device, and a second networking fabric via a second uplink on the networking device. The networking device receives communications from the computing device that identify first and second logical ports provided using the physical port on the computing device, a first data traffic type associated with the first networking fabric and transmitted on the first logical port, and a second data traffic type associated with the second networking fabric and transmitted on the second logical port. If the first uplink becomes unavailable, the networking device transmits a communication to the computing device that causes the computing device to stop transmitting the first data traffic type via the first logical port while continuing to transmit the second data traffic type via the second logical port. As such, the unavailability of a networking fabric communication link to a networking fabric will only result in prevention of the data traffic stream over the logical port associated with that networking fabric, rather than the prevention of data traffic streams over all of the logical ports (via the disabling of the networking device physical port on the networking device that connects to the computing device physical port on the computing device that provides those logical ports), as is done in conventional systems.

Figure 6A:
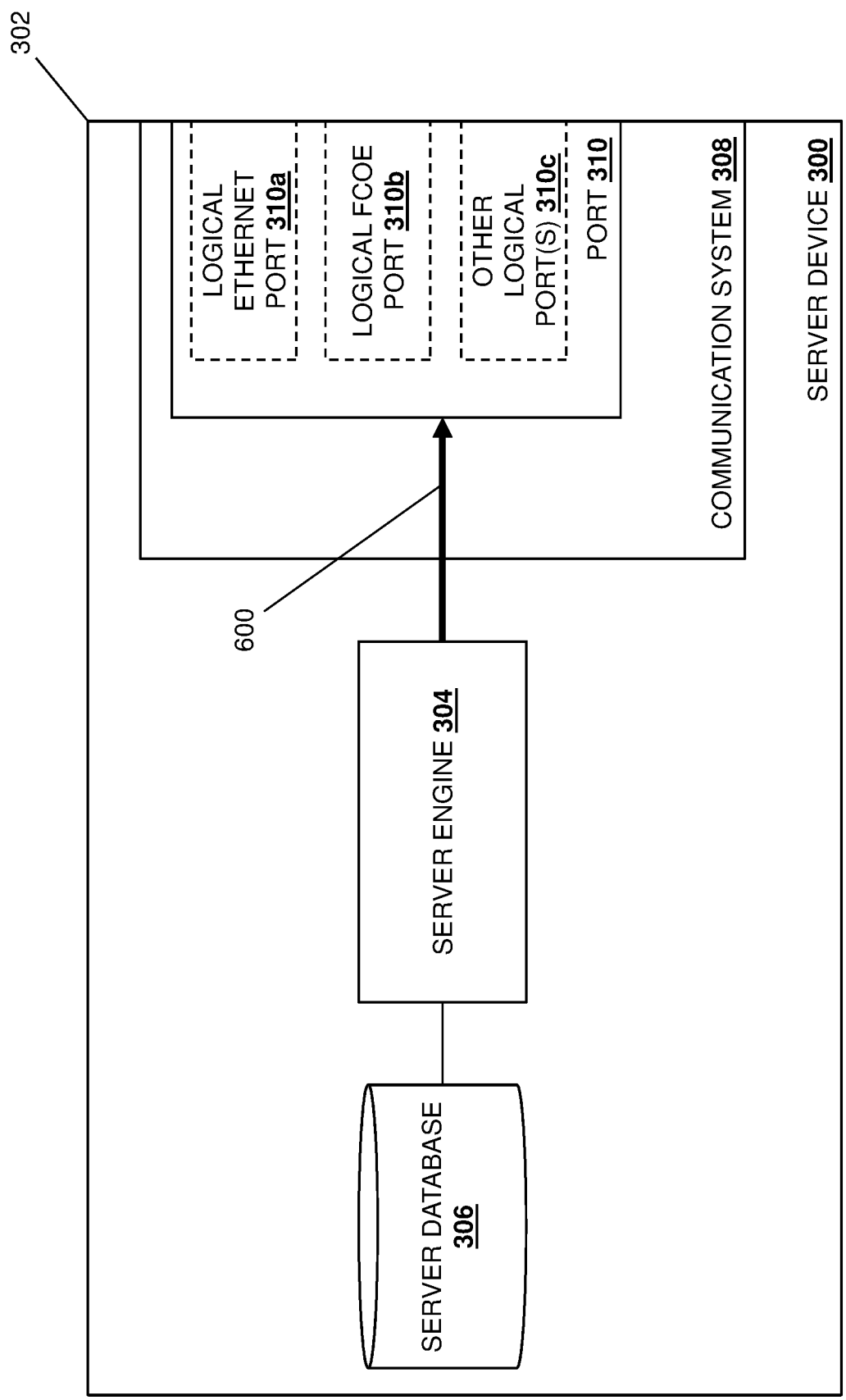
FIG. 6A is a schematic view illustrating an embodiment of the server device of FIG. 3 operating during the method of FIG. 5.

The method 500 begins at block 502 where a networking device receives logical port identification communications from computing device. In an embodiment, at or prior to block 502, the server device 202/300 may have the port 310 in its communication system 308 configured with the logical Ethernet port 310a, the logical FCoE port 310b, and/or any of the other logical port(s) 310c (e.g., a logical management port, a logical iSCSI port, etc.) that would be apparent to one of skill in the art in possession of the present disclosure. Furthermore, in some embodiments of block 502, the server device 202/300 may be powered on, reset, rebooted, and/or otherwise initialized and, in response, the server engine 304 in the server device 202/300 may operate to generate and transmit logical port identification communications to the switch devices 204a/400 and 204b/400. For example, FIG. 6A illustrates how the server engine 304 in the server device 202/300 may perform logical port identification communication transmission operations 600 to generate and transmit one or more logical port identification communications via the port 310 on in the communication system 308. For example, the one or more logical port identification communications may include a logical Ethernet port identification communication that identifies the logical Ethernet port 310a for the transmission of Ethernet data traffic, a logical FCoE port identification communication that identifies the logical FCiE port 310b for the transmission of FCoE data traffic, as well as other logical port identification communication(s) that identify each of the other logical port(s) 310c for the transmission of other data traffic (e.g., management data traffic, iSCSI data traffic, etc.).

In specific embodiments, any of the logical port identification communications transmitted at block 502 may include a Link Layer Discovery Protocol (LLDP) Protocol Data Unit (PDU) with a Type-Length-Value (TLV) data structure that includes logical port identification information for the corresponding logical port that is being identified in that logical port identification communication. For example, the logical port identification information in the TLV data structure of the LLDP PDU may identify a type of data traffic being transmitted via a logical port, along with an Options field that may indicate the status of the logical link provided via that logical port (e.g., active or inactive). As such, the TLV data structure in the LLDP PDU may include a [Traffic Type, Options] field that allows the server engine 304 in the server device 202/300 to communicate a type of data traffic that will be carried on a logical link provided by each logical port, and a status of the logical link provided by that logical port. Thus, continuing with the example above, at block 502 the logical Ethernet port identification communication transmitted by the server engine 304 in the server device 202a/300 may include an LLDP PDU with a TLV data structure having an [Ethernet, active] field, and the logical FCoE port identification communication transmitted by the server engine 304 in the server device 202a/300 may include an LLDP PDU with a TLV data structure having an [FCoE, active] field. However, while specific examples of the logical port identification communications are described above, one of skill in the art in possession of the present disclosure will appreciate the other techniques may be utilized to provide for the association of logical port data traffic with networking fabrics discussed below while remaining within the scope of the present disclosure as well.

Figure 6C:
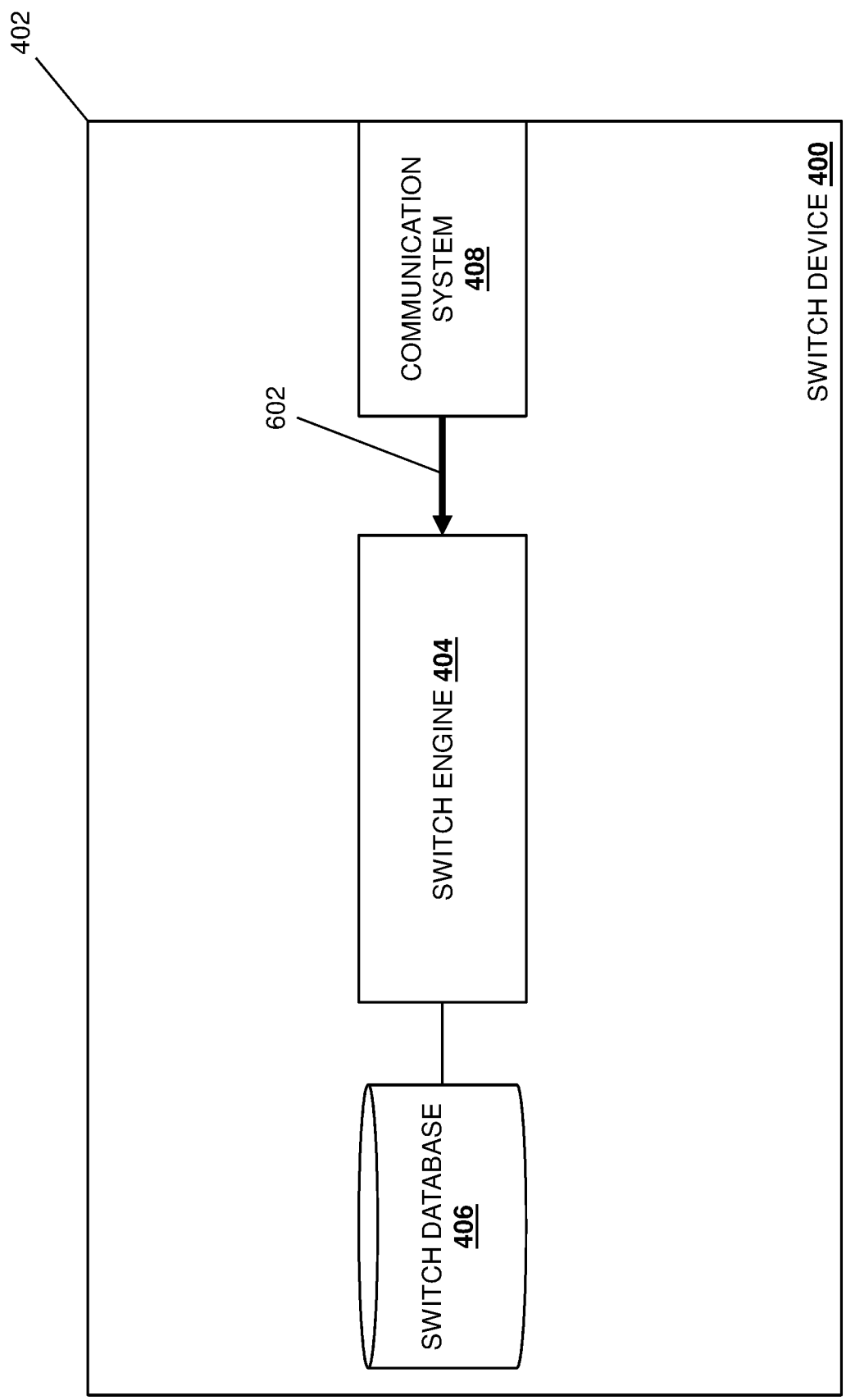
FIG. 6C is a schematic view illustrating an embodiment of the switch device of Fig. e operating during the method of FIG. 5.

With reference to FIG. 6B, the logical port identification communication transmission operations 600 may include the transmission of logical port identification communications from the server device 202 to each of the switch devices 204a and 204b. Furthermore, FIG. 6C illustrated how the switch engine 404 in each of the switch devices 204a/400 and 204b/400 may perform logical port identification communication receiving operations 602 to receive the logical port identification communications from the server device 202/300 via its communication system 408.

Figure 6D:
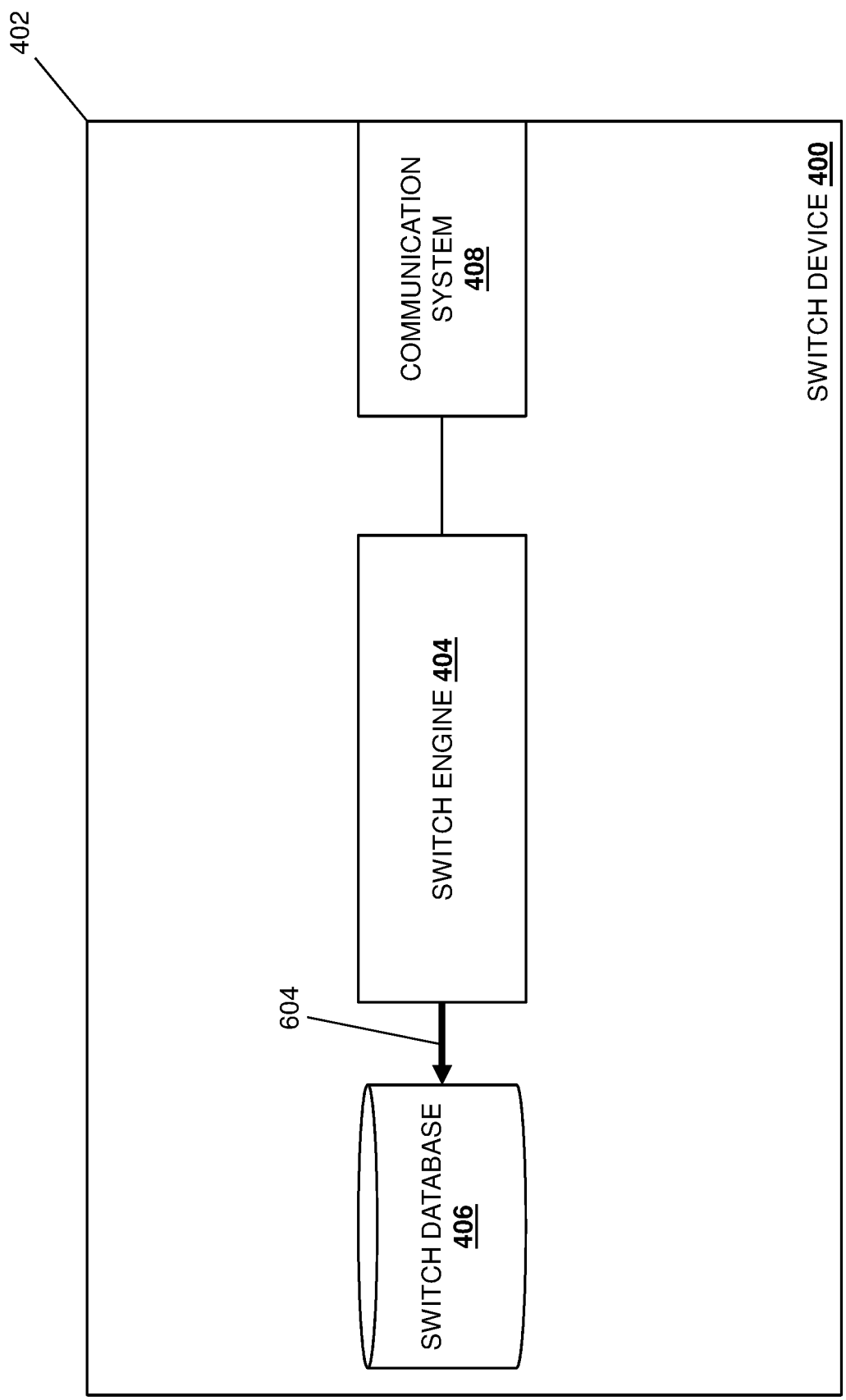
FIG. 6D is a schematic view illustrating an embodiment of the switch device of Fig. e operating during the method of FIG. 5.

The method 500 then proceeds to block 504 where the networking device associates logical ports on the computing device with respective networking fabrics. With reference to FIG. 6D, in an embodiment of block 504 and in response to receiving the logical port identification communications at block 502, the switch engine 404 in the switch devices 204a/400 and 204b/400 may operate to perform logical port/networking fabric association operations 604 to associate logical ports provided on the server device 202 with respective networking fabrics in its switch database 406. Continuing with the example provided above, at block 504 the switch engine 404 in the switch device 204a/400 may identity the active logical link status reported in the logical Ethernet port identification communication for the logical Ethernet link provided by the logical Ethernet port 310a, as well as the Ethernet data traffic type identified for transmission via the logical Ethernet link provided by the logical Ethernet port 310a, and then map the logical Ethernet port 310a with the Ethernet networking fabric communication link 206a to the Ethernet networking fabric 206 in its switch database 406. Similarly, at block 504 the switch engine 404 in the switch device 204a/400 may identity the active logical link status reported in the logical FCoE port identification communication for the logical FCoE link provided by the logical FCoE port 310b, as well as the FCoE data traffic type identified for transmission via the logical FCoE link provided by the logical FCoE port 310b, and then map the logical FCoE port 310b with the FC networking fabric communication link 208a to the FC networking fabric 208 in its switch database 406.

Similarly as well, at block 504 the switch engine 404 in the switch device 204b/400 may identity the active logical link status reported in the logical Ethernet port identification communication for the logical Ethernet link provided by the logical Ethernet port 310a, as well as the Ethernet data traffic type identified for transmission via the logical Ethernet link provided by the logical Ethernet port 310a, and then map the logical Ethernet port 310a with the Ethernet networking fabric communication link 206a to the Ethernet networking fabric 206 in its switch database 406. Similarly as well, at block 504 the switch engine 404 in the switch device 204b/400 may identity the active logical link status reported in the logical FCoE port identification communication for the logical FCoE link provided by the logical FCoE port 310b, as well as the FCoE data traffic type identified for transmission via the logical FCoE link provided by the logical FCoE port 310b, and then map the logical FCoE port 310b with the FC networking fabric communication link 208a to the FC networking fabric 208 in its switch database 406.

The method 500 then proceeds to block 506 where the networking device transmits data traffic received from the logical ports on the computing device via associated networking fabrics. In an embodiment, at block 506, the server engine 304 in the server device 202/300 may then operate to transmit and receive data traffic via its logical Ethernet port 310a, its logical FCoE port 310b, and/or any of its other logical port(s) 310c, which one of skill in the art in possession of the present disclosure will recognize may be received by one of the switch devices 204a and 204b and forwarded to the Ethernet networking fabric 206 or the FC networking fabric 208. For example, at block 506, the server device 202 may transmit Ethernet data traffic via its logical Ethernet port 310a to either of the switch devices 204a and 204b, and that switch device 204a or 204b will then forward that Ethernet data traffic via its respective Ethernet networking fabric communication link 206a and 206b to the Ethernet networking fabric 206. Similarly, at block 506, either of the switch devices 204a and 204b may receive and forward Ethernet data traffic from the Ethernet networking fabric 206 and forward that Ethernet data traffic to the server device 202 via its logical Ethernet port 310a.

Similarly as well, at block 506, the server device 202 may transmit FCoE data traffic via its logical FCoE port 310b to either of the switch devices 204a and 204b, and that switch device 204a or 204b will then forward that FCoE data traffic via its respective FC networking fabric communication link 208a and 208b to the FC networking fabric 208. Similarly, at block 506, either of the switch devices 204a and 204b may receive and forward FCoE data traffic from the FC networking fabric 208 and forward that FCoE data traffic to the server device 202 via its logical FCoE port 310b.

The method 500 then proceeds to decision block 508 where it is determined whether a networking fabric link to a networking fabric has become unavailable. In an embodiment, at decision block 508, the switch engine 404 in each of the switch devices 204a/400 and 204b/400 may operate to monitor its communication links to the Ethernet networking fabric 206 and the FC networking fabric 208 to determine whether those communication links are available. For example, at decision block 508, the switch engine 404 in the switch device 204a/400 may monitor its Ethernet networking fabric communication link 206a to the Ethernet networking fabric 206 to determine whether it is available, and monitor its FC networking fabric communication link 208a to the FC networking fabric 208 to determine whether it is available. Similarly, at decision block 508, the switch engine 404 in the switch device 204b/400 may monitor its Ethernet networking fabric communication link 206b to the Ethernet networking fabric 206 to determine whether it is available, and monitor its FC networking fabric communication link 208b to the FC networking fabric 208 to determine whether it is available.

If, at decision block 506, it is determined that a networking fabric link to a networking fabric has not become unavailable, the method 500 returns to block 506. As such, the method 500 may loop between blocks 506 and decision block 508 such that the switch devices 204a and 204b transmit data traffic received from the logical ports on the server device 202 via the Ethernet networking fabric and the FC networking fabric as along as the Ethernet networking fabric communication links 206a and 206b to the Ethernet networking fabric 206, and the FC networking fabric links 208a and 208b to the FC networking fabric 208, are available.

Figure 6E:
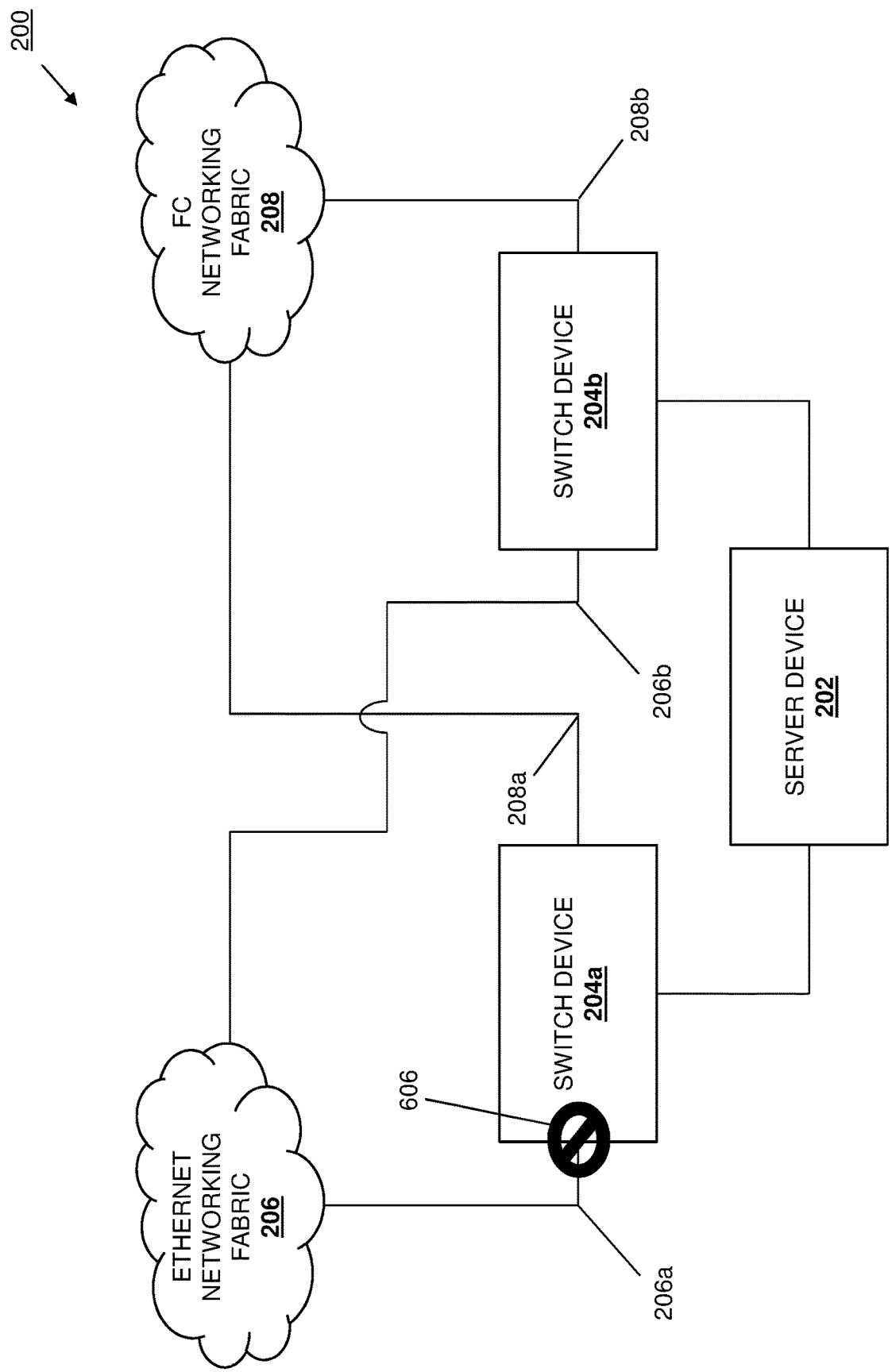
FIG. 6E is a schematic view illustrating an embodiment of the multi-logical port data traffic stream preservation system of FIG. 2 operating during the method of FIG. 5.

If at decision block 506, it is determined that a networking fabric link to a networking fabric has become unavailable, the method 500 proceeds to block 510 where the networking device transmits a logical port disable communication associated with the unavailable logical port to the computing device. In an embodiment, at block 510 and in response to determining that a networking fabric communication link to a network fabric has failed, "gone down", and/or otherwise become unavailable, the switch engine 404 in the switch device 204/400 may operate to transmit a logical port disable communication to the server device 202. For example, with reference to FIG. 6E, the Ethernet networking fabric communication link 206a to the Ethernet networking fabric 206 may fail, "go down", and/or otherwise become unavailable (e.g., due to the switch port in the communication system 408 in the switch device 204a failing, "going down" and/or otherwise becoming available) as illustrated by element 606, and that failure, "down" status, and/or other unavailability may be detected by the switch engine 404 in the switch device 204/400 at decision block 506. However, while the specific example provided herein discusses the unavailability of the Ethernet networking fabric communication link 206a, one of skill in the art in possession of the present disclosure will recognize that the method 500 may operate similarly as discussed below in response to the unavailability of the Ethernet networking fabric communication link 206b, the FC networking fabric communication link 208a, and/or the FC networking fabric communication link 208b.

Figure 6G:
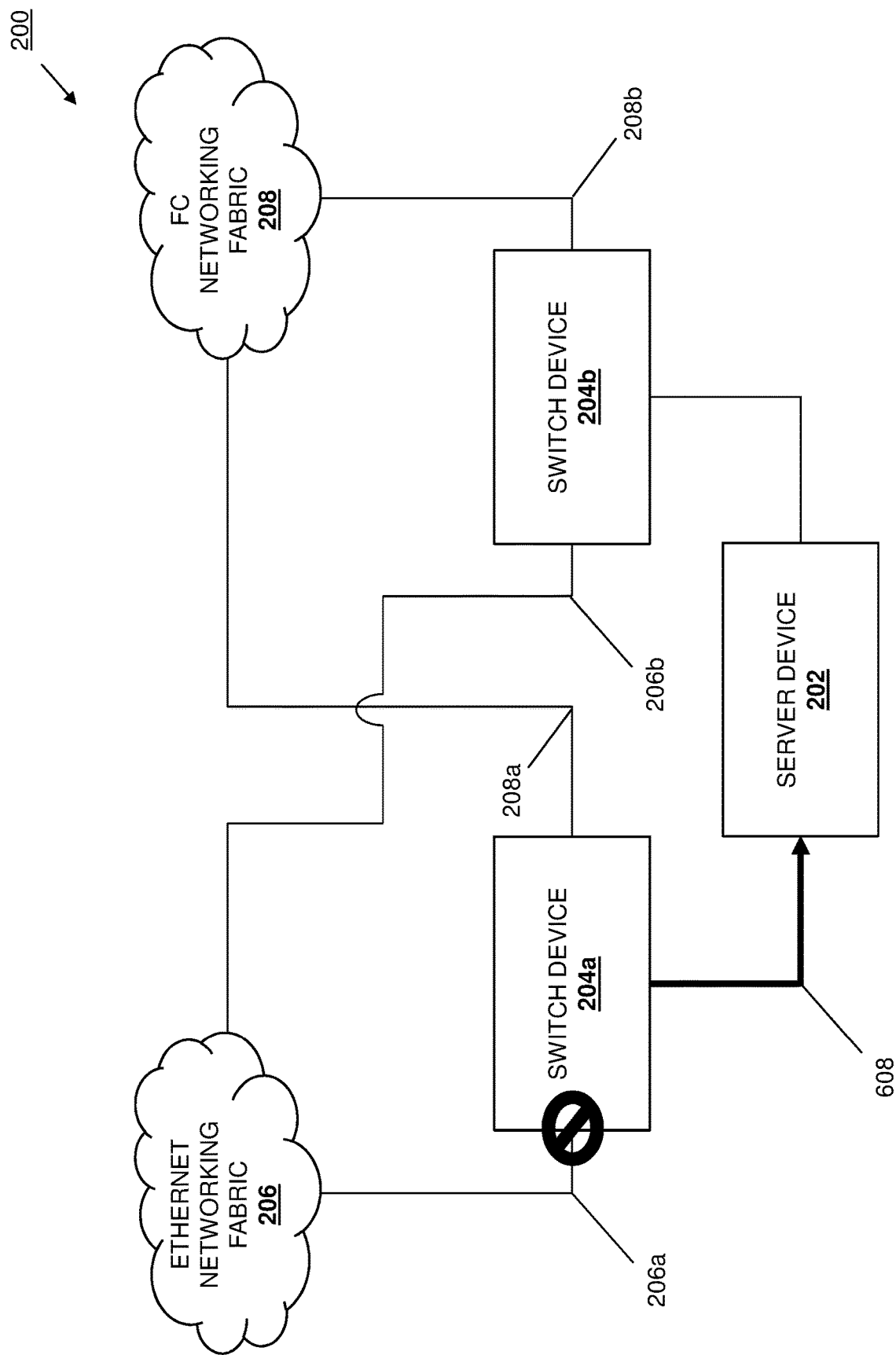
FIG. 6G is a schematic view illustrating an embodiment of the multi-logical port data traffic stream preservation system of FIG. 2 operating during the method of FIG. 5.

With reference to FIG. 6F, in response to detecting the unavailability of the Ethernet networking fabric communication link 206a, the switch engine 404 in the switch device 204/400 may operate to perform logical port identification operations 606 by, for example, accessing the switch database 406 to identify a logical port on the server device 202 that is associated with the Ethernet networking fabric 206/Ethernet networking fabric communication link 206a. As discussed above, the switch database 408 may store mappings of the logical ports on the server device 2020 with the networking fabric communication links to the networking fabrics, and thus at block 510 the switch engine 404 in the switch device 204/400 may identify that the logical Ethernet port 310a provided on the server device 202/300 is mapped to the Ethernet networking fabric communication link 206a to the Ethernet networking fabric 206. With reference to FIGS. 6F and 6G, in response to identifying the logical Ethernet port 310a provided on the server device 202/300, the switch engine 404 in the switch device 204/400 may perform logical port disable communication transmission operations 608 that include generating a logical port disable communication and transmitting that logical port disable communication via the communication system 408 (e.g., via a switch port in the communication system 408 that is connected to the server device 202 via an Ethernet cable as discussed above) and to the server device 202. In a specific example, the logical port disable communication may be provided by an LLDP PDU that identifies the type of data traffic associated with the unavailable networking fabric communication link (e.g., Ethernet data traffic associated with the unavailable Ethernet networking fabric communicating link 206a in the example above), and includes a disable command in an Options field in a TLV data structure. However, while a specific logical port disable communication is described, one of skill in the art in possession of the present disclosure will recognize that other logical port disable communications will fall within the scope of the present disclosure as well.

Figure 6H:
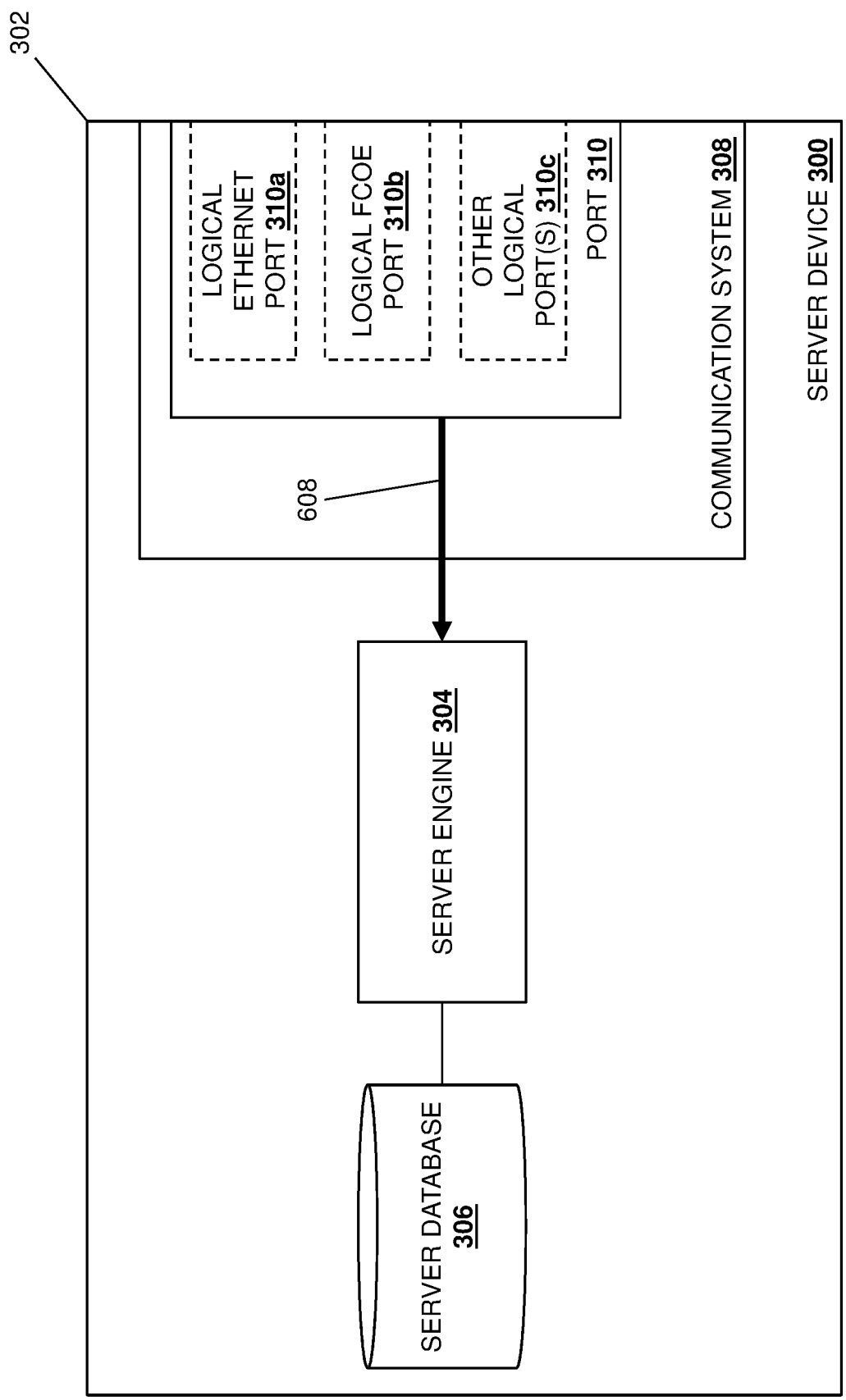
FIG. 6H is a schematic view illustrating an embodiment of the server device of FIG. 3 operating during the method of FIG. 5.

As illustrated in FIG. 6H, as part of the logical port disable communication transmission operations 608, the server engine 304 in the server device 202/300 may receive the logical port disable communication transmitted by the switch device 204a/400 via the port 310 in its communication system 308. In response to receiving the logical port disable communication, the server engine 304 in the server device 200/300 may determine the type of data traffic identified in that logical port disable communication (e.g., the Ethernet data traffic associated with the unavailable Ethernet networking fabric communicating link 206a as discussed above) and a command (e.g., the disable command as discussed above) associated with that type of data traffic.

Figure 6I:
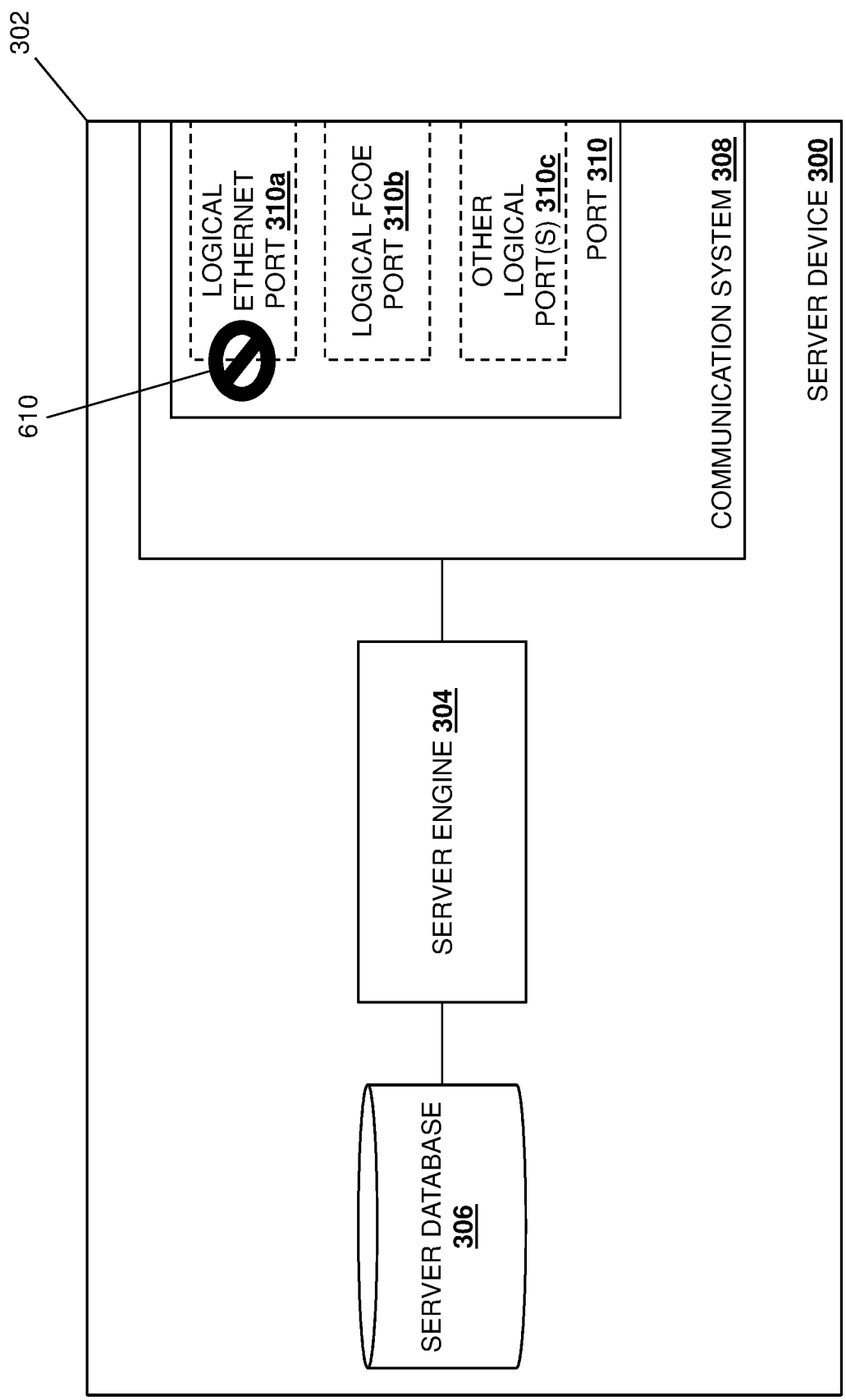
FIG. 6I is a schematic view illustrating an embodiment of the server device of FIG. 3 operating during the method of FIG. 5.

With reference to FIG. 6I, in response to identifying that Ethernet data traffic should be disabled, the server engine 304 in the server device 202/300 may operate to "disable" the logical Ethernet port 310a to prevent Ethernet data traffic from being transmitted via the logical Ethernet port 310a to the switch device 204a, as indicated by element 610. In a specific example, the "disabling" of the logical Ethernet port 310a/prevention of transmission of Ethernet data traffic to the switch device 204a may be performed at block 510 by preventing an operating system that is provided by the server engine 304 from transmitted Ethernet data traffic via the logical Ethernet link 310a to the switch device 204a. However, while a specific example has been provided of logical port disabling and/or the prevention of data traffic transmissions to a switch device, one of skill in the art in possession of the present disclosure will recognize that logical ports may be disabled and/or data traffic may be prevented from being transmitted to a particular switch device in a variety of manners that will fall within the scope of the present disclosure as well. Thus, one of skill in the art in possession of the present disclosure will recognize that while the logical Ethernet port 310a may be "disabled" and/or Ethernet data traffic transmissions may be prevented to the switch device 204a, the physical/hardware port 310 is still "active", "up", and/or otherwise available, which may allow Ethernet data traffic transmissions via the logical Ethernet port 310a to the switch device 204b, FCoE data traffic transmissions via the logical FCoE port 310b to the switch devices 204a and 204b, and other data traffic transmissions via the other logical port(s) 310c to the switch device(s) 204a and 204b.

The method 500 then proceeds to block 512 where the networking device transmits data traffic received from available logical ports on the computing device via associated networking fabrics. In an embodiment, at block 512, the server engine 304 in the server device 202/300 may operate to transmit data traffic via its "enabled" logical ports. Continuing with the example provided above, at block 512 the server engine 304 in the server device 202/300 may transmit Ethernet data traffic via the logical Ethernet port 310a to the switch device 204b, FCoE data traffic via the logical FCoE port 310b to the switch devices 204a and 204b, and other data traffic via the other logical port(s) 310c to the switch device(s) 204a and 204b, while preventing the transmission of Ethernet data traffic via the logical Ethernet port 310a to the switch device 204a.

Thus, as will be appreciated by one of skill in the art in possession of the present disclosure, the use of data traffic bandwidth between the server device 202 and the Ethernet networking fabric 206 and FC networking fabric 208 may be maximized by utilizing each of the available networking fabric communication links (e.g., the FCoE networking fabric communication link 208a, the Ethernet networking fabric communication link 206b, and the FC networking fabric communication link 208b in the example above), as opposed to the shutting down of the switch port on the switch device 204a that connects to the server device 202 such that neither of the Ethernet networking fabric communication link 206a or the FCoE networking fabric communication link 208a may be used. However, while a pair of redundant switch devices 204a and 204b are described in the examples provided herein, one of skill in the art in possession of the present disclosure will recognize that the systems and methods of the present disclosure provide benefits when the server device 202 is connected to the Ethernet networking fabric 206 and the FC networking fabric 208 via a single switch device (e.g., the switch device 204a). For example, in the event of the failure of the Ethernet networking fabric communication link 206a in such a configuration, the server engine 304 in the server device 202/300 may continue to transmit FCoE data traffic via the logical FCoE port 310*b* to the switch device 204 for transmission via the FC networking fabric communication link 208*a* to the FC networking fabric 208, as opposed to the shutting down of the switch port on the switch device 204*a* that connects to the server device 202 such that neither of the Ethernet networking fabric communication link 206*a* or the FCoE networking fabric communication link 208*a* may be used.

The method 500 then proceeds to decision block 514 where it is determined whether the networking fabric link to the networking fabric has become available. In an embodiment, at decision block 514, the switch engine 404 in the switch device 204*a*/400 may operate to determine whether its unavailable communication link to the networking fabric that became unavailable has subsequently become available. Continuing with the example above, at decision block 508, the switch engine 404 in the switch device 204*a*/400 may utilize a variety of link availability determination techniques known in the art to determine whether its Ethernet networking fabric communication link 206*a* to the Ethernet networking fabric 206 has become available, and one of skill in the art in possession of the present disclosure will recognize that either of the switch devices 204*a* and 204*b* may determine whether any unavailable networking fabric communication link has become available at decision block 514 while remaining within the scope of the present disclosure as well.

If, at decision block 514, it is determined that the networking fabric link to the networking fabric has not become available, the method 500 returns to block 512. As such, the method 500 may loop such that the server engine 304 in the server device 202/300 transmits Ethernet data traffic via the logical Ethernet port 310*a* to the switch device 204*b*, FCoE data traffic via the logical FCoE port 310*b* to the switch devices 204*a* and 204*b*, and other data traffic via the other logical port(s) 310*c* to the switch device(s) 204*a* and 204*b*, while preventing the transmission of Ethernet data traffic via the logical Ethernet port 310*a* to the switch device 204*b*, as long as the Ethernet networking fabric communication link 206*a* remains unavailable. Similarly, in embodiments in which the server device 202 is connected to the Ethernet networking fabric 206 and the FC networking fabric 208 via a single switch device (e.g., the switch device 204*a*), the server engine 304 in the server device 202/300 may continue to transmit FCoE data traffic via the logical FCoE port 310*b* to the switch device 204 for transmission via the FC networking fabric communication link 208*a* to the FC networking fabric 208 as long as the Ethernet networking fabric communication link 206*a* remains unavailable.

Figure 6J:
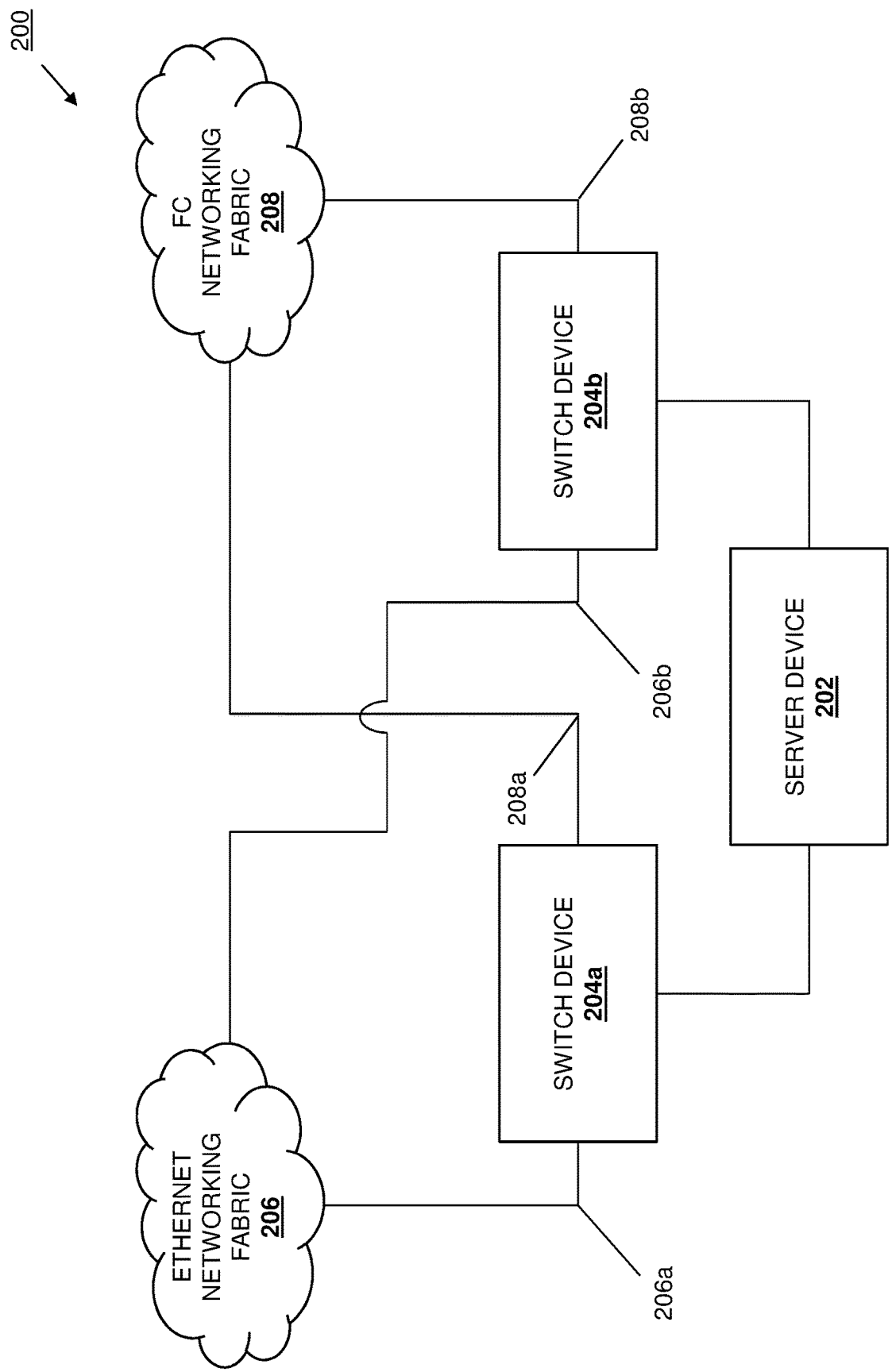
FIG. 6J is a schematic view illustrating an embodiment of the multi-logical port data traffic stream preservation system of FIG. 2 operating during the method of FIG. 5.

If at decision block 514, it is determined that the networking fabric link to the networking fabric has become available, the method 500 proceeds to block 516 where the networking device transmits a logical port enable communication associated with the logical port that has become available to the computing device. In an embodiment, at block 516 and in response to determining that the networking fabric communication link to the network fabric that was unavailable become unavailable, the switch engine 404 in the switch device 204*a*/400 may operate to transmit a logical port enable communication to the server device 202. For example, with reference to FIG. 6J, the Ethernet networking fabric communication link 206*a* may recover, "come up", and/or otherwise become available (e.g., due to the switch port in the communication system 408 in the switch device 204*a* recovering, "coming up" and/or otherwise becoming available) as illustrated by the lack of element 606, and that recovery, "up" status, and/or other availability may be detected by the switch engine 404 in the switch device 204/400 at decision block 514. However, while the specific example provided herein discusses the availability of the Ethernet networking fabric communication link 206*a* following its unavailability, one of skill in the art in possession of the present disclosure will recognize that the method 500 may operate similarly as discussed below in response to the availability of the Ethernet networking fabric communication link 206*b*, the FC networking fabric communication link 208*a*, and/or the FC networking fabric communication link 208*b* subsequent to their respective unavailability as well.

Figure 6K:
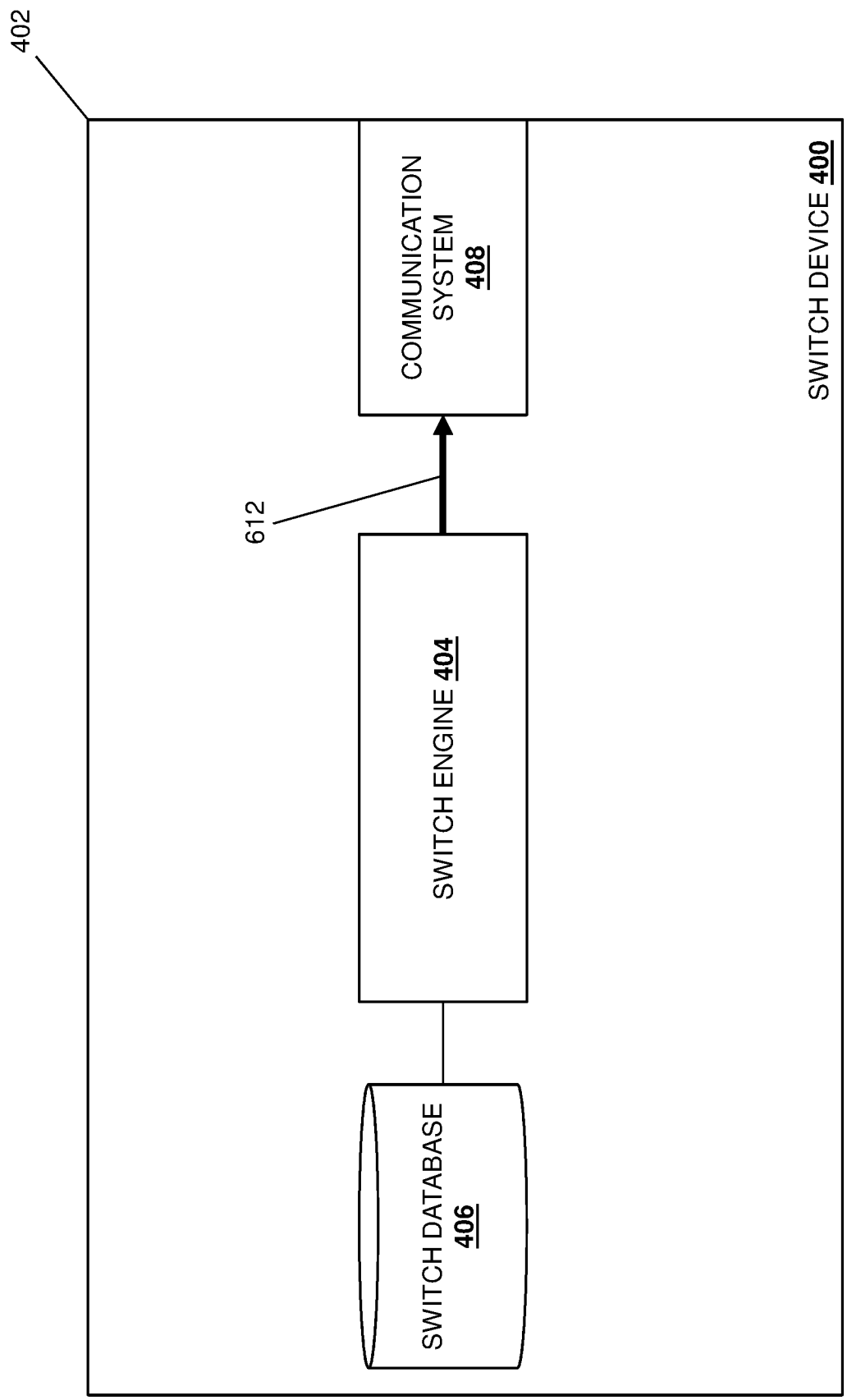
FIG. 6K is a schematic view illustrating an embodiment of the switch device of Fig. e operating during the method of FIG. 5.

With reference to FIG. 6*k*, in response to detecting the availability of the Ethernet networking fabric communication link 206*a*, the switch engine 404 in the switch device 204/400 may operate to perform logical port enable communication transmission operations 612 that include generating a logical port enable communication and transmitting that logical port enable communication via the communication system 408 (e.g., via a switch port in the communication system 408 that is connected to the server device 202 via an Ethernet cable as discussed above) and to the server device 202. In a specific example, the logical port enable communication may be provided by an LLDP PDU that identifies the type of data traffic associated with the available networking fabric communication link (e.g., Ethernet data traffic associated with the available Ethernet networking fabric communicating link 206*a* in the example above), and includes an enable command in an Options field in a TLV data structure. However, while a specific logical port enable communication is described, one of skill in the art in possession of the present disclosure will recognize that other logical port enable communications will fall within the scope of the present disclosure as well.

Figure 6M:
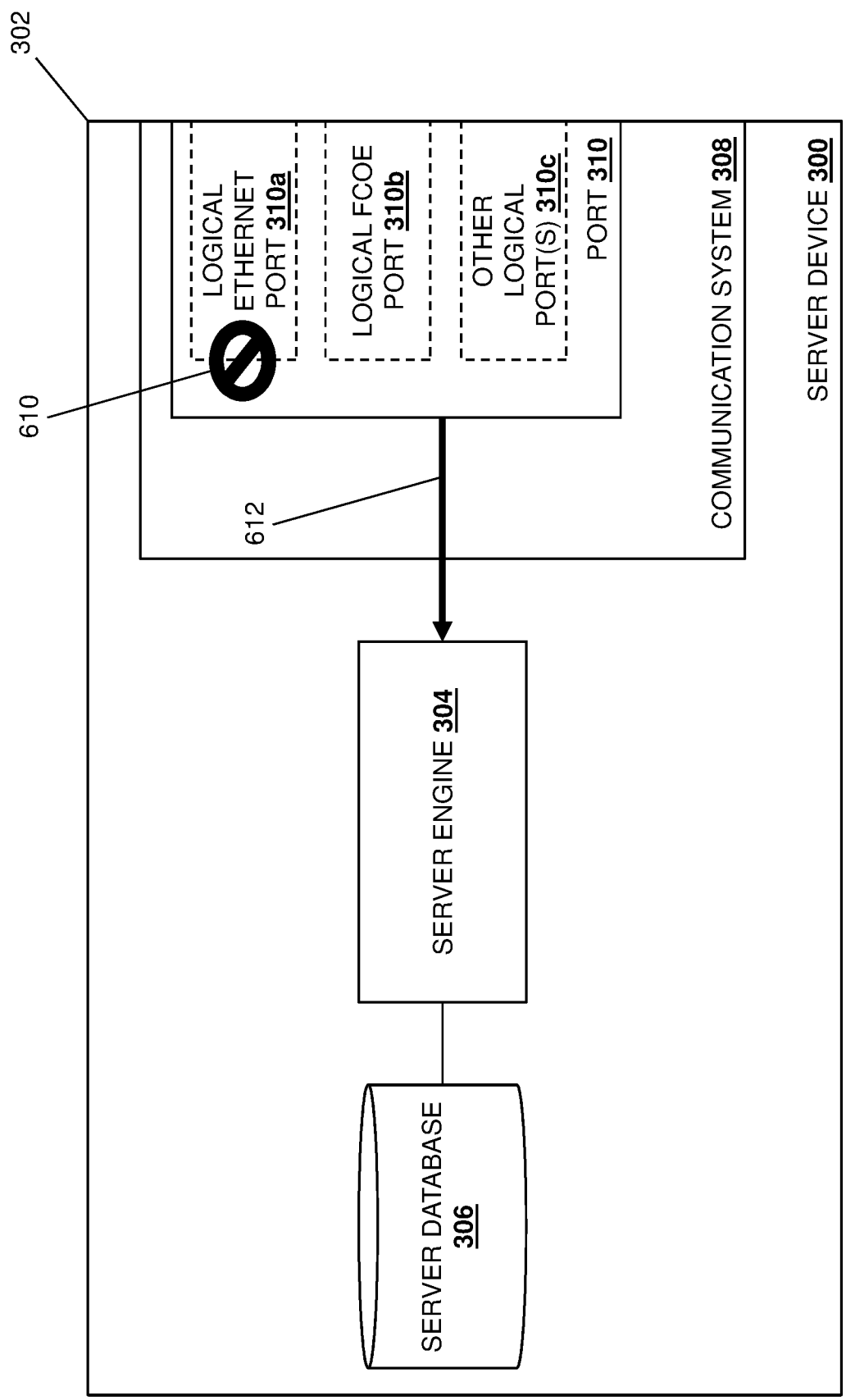
FIG. 6M is a schematic view illustrating an embodiment of the server device of FIG. 3 operating during the method of FIG. 5.

As illustrated in FIG. 6M, as part of the logical port enable communication transmission operations 612, the server engine 304 in the server device 202/300 may receive the logical port enable communication transmitted by the switch device 204*a*/400 via the port 310 in its communication system 308. In response to receiving the logical port enable communication, the server engine 304 in the server device 200/300 may determine the type of data traffic identified in that logical port enable communication (e.g., the Ethernet data traffic associated with the available Ethernet networking fabric communicating link 206*a* as discussed above) and a command (e.g., the enable command as discussed above) associated with that type of data traffic.

Figure 6N:
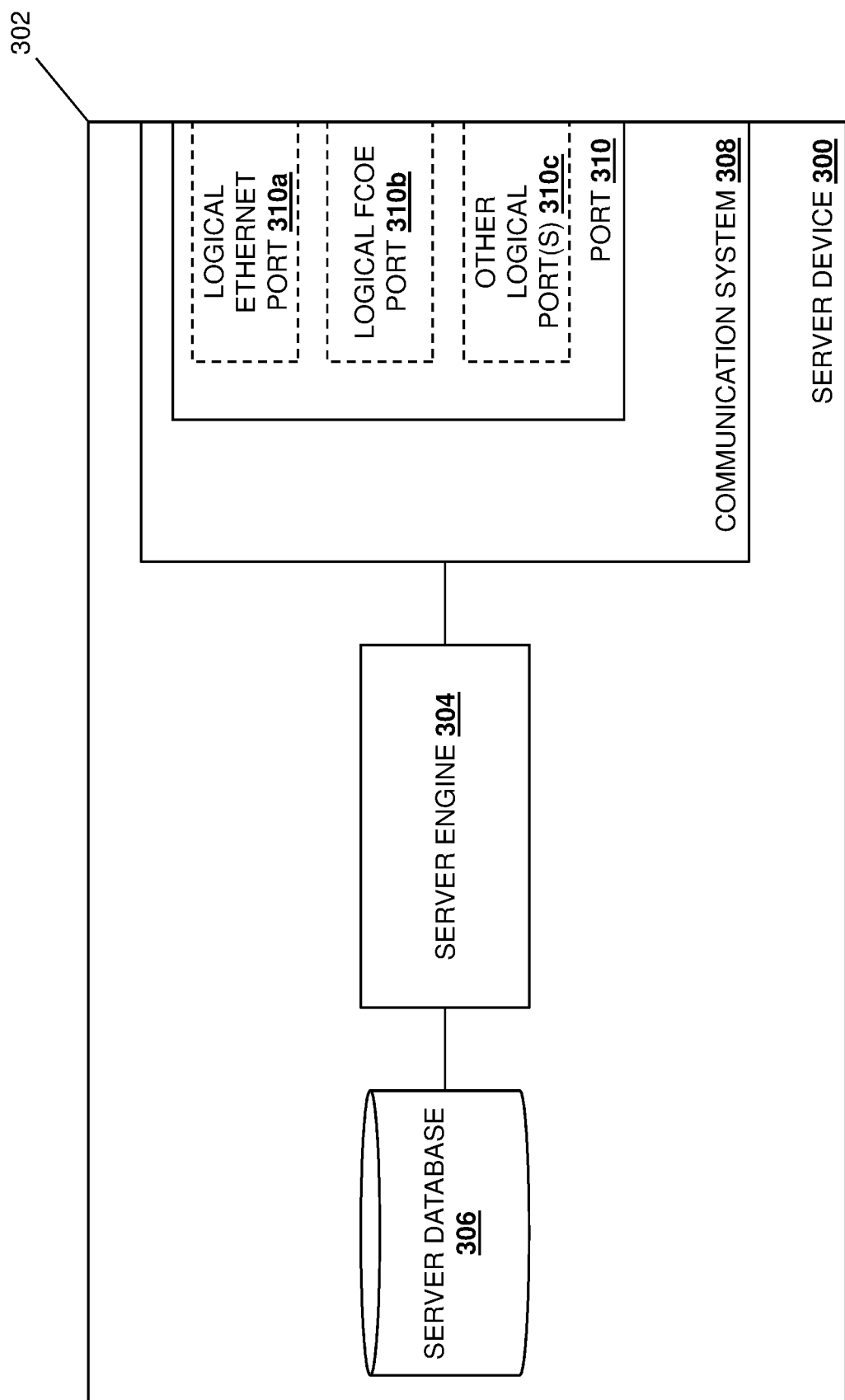
FIG. 6N is a schematic view illustrating an embodiment of the server device of FIG. 3 operating during the method of FIG. 5.

With reference to FIGS. 6M and 6N, in response to identifying that Ethernet data traffic should be enabled, the server engine 304 in the server device 202/300 may operate to "enable" the logical Ethernet port 310*a* to allow Ethernet data traffic to be transmitted via the logical Ethernet port 310*a* to the switch device 204*a*, as indicated by the removal of element 610 from FIG. 6M to FIG. 6N. In a specific example, the "enabling" of the logical Ethernet port 310*a*/ allowing of the transmission of Ethernet data traffic to the switch device 204*a* may be performed at block 516 by allowing the operating system that is provided by the server engine 304 to transmit Ethernet data traffic via the logical Ethernet link 310*a* to the switch device 204*a*. However, while a specific example has been provided of logical port enabling and/or the allowing of data traffic transmissions to a switch device, one of skill in the art in possession of the present disclosure will recognize that logical ports may be enabled and/or data traffic may be allowed to be transmitted to a particular switch device in a variety of manners that will fall within the scope of the present disclosure as well. Thus, one of skill in the art in possession of the present disclosure will recognize that the enabling of the logical Ethernet port 310a may allow Ethernet data traffic transmissions via the logical Ethernet port 310a to the switch devices 204a and 204b, FCoE data traffic transmissions via the logical FCoE port 310b to the switch devices 204a and 204b, and other data traffic transmissions via the other logical port(s) 310c to the switch device(s) 204a and 204b. Similarly, in embodiments in which the server device 202 is connected to the Ethernet networking fabric 206 and the FC networking fabric 208 via a single switch device (e.g., the switch device 204a), the enabling of the logical Ethernet port 310a may allow Ethernet data traffic transmissions via the logical Ethernet port 310a to the switch device 204a, and FCoE data traffic transmissions via the logical FCoE port 310b to the switch device 204a.

The method 500 then returns to block 506. As such, the method 500 may loop such that the server device 202 transmits data traffic via each of its logical ports to each of the switch devices 204a and 204b (or to a single switch device) as long as all of the networking fabric communication links to the networking fabrics on those switch device(s) remain available, while "disabling" any logical port to any switch device in the event of the unavailability of any networking fabric communication link to the networking fabric that is utilized to transmit the data traffic provided via that logical port, and "enabling" that logical port in the event of the subsequent availability of that networking fabric communication link.

Thus, systems and methods have been described that provide for the preservation of data traffic streams received via logical ports provided by a physical port on a server device and transmitted over respective networking fabrics when the networking fabric communication link to one or more of the networking fabrics becomes unavailable. For example, the multi-logical port data traffic stream preservation system of the present disclosure includes a switch device coupled to a server device via a physical port on that server device, a first networking fabric via a first uplink with the switch device, and a second networking fabric via a second uplink on the switch device. The switch device receives communications from the server device that identify first and second logical ports provided using the physical port on the server device, a first data traffic type associated with the first networking fabric and transmitted on the first logical port, and a second data traffic type associated with the second networking fabric and transmitted on the second logical port. If the first uplink becomes unavailable, the switch device transmits a communication to the server device that causes the server device to stop transmitting the first data traffic type via the first logical port while continuing to transmit the second data traffic type via the second logical port. As such, the unavailability of a networking fabric communication link to a networking fabric will only result in prevention of the data traffic stream over the logical port associated with that networking fabric, rather than the prevention of data traffic streams over all of the logical ports (via the disabling of the switch device physical port on the switch device that connects to the server device physical port on the server device that provides those logical ports), as is done in conventional systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-logical port data traffic stream preservation system, comprising:
a computing device including a physical port;
a first networking fabric;
a second networking fabric;
a networking device that is coupled to the computing device via the physical port, the first networking fabric via a first networking fabric communication link, and a second networking fabric via a second networking fabric communication link, wherein the networking device is configured to:
receive, from the computing device via the physical port, a first logical port identification communication that identifies a first logical port provided using the physical port on the computing device and a first data traffic type associated with the first networking fabric;
receive, from the computing device via the physical port, a second logical port identification communication that identifies a second logical port provided using the physical port on the computing device and a second data traffic type associated with the second networking fabric;
determine that the first networking fabric communication link has become unavailable; and
transmit, in response to determining that the first networking fabric communication link has become unavailable, a first logical port disable communication to the computing device that is configured to cause the computing device to stop transmitting first data traffic having the first data traffic type via the first logical port while continuing to transmit second data traffic having the second data traffic type via the second logical port.

2. The system of claim 1, wherein the first data traffic type is provided by one of an Ethernet data traffic type and a Fibre Channel-based data traffic type, and the second data traffic type is provided by the other of the Ethernet data traffic type and the Fibre Channel-based data traffic type.

3. The system of claim 1, wherein the first logical port identification communication includes a first Type-Length-Value (TLV) data structure in a first Link Layer Discovery Protocol (LLDP) Protocol Data Unit (PDU) communication that identifies the first logical port and the first data traffic type, and wherein the second logical port identification communication includes a second TLV data structure in a second LLDP PDU communication that identifies the second logical port and the second data traffic type.

4. The system of claim 3, wherein the first logical port identification communication includes a first options field that indicates an active status for the first logical port, and wherein the second logical port identification communication includes a second options field that indicates an active status for the second logical port.

5. The system of claim 1, wherein the first logical port disable communication includes a first Type-Length-Value (TLV) data structure in a first Link Layer Discovery Protocol (LLDP) Protocol Data Unit (PDU) communication with a first options field that indicates that the first logical port should be disabled.

6. The system of claim 1, wherein the networking device is configured to:
determine that the first networking fabric communication link has become available; and transmit, in response to determining that the first networking fabric communication link has become available, a first logical port enable communication to the computing device that is configured to cause the computing device to begin transmitting the first data traffic having the first data traffic type via the first logical port.

7. An Information Handling System (IHS), comprising:
a processing system; and
a memory system that is coupled to the processing system and that includes instructions that, when executed by the processing system, cause the processing system to provide a networking engine that is configured to:
receive, from a computing device via a physical port on the computing device, a first logical port identification communication that identifies a first logical port provided using the physical port on the computing device and a first data traffic type associated with a first networking fabric that is accessible to the processing system via a first networking fabric communication link;
receive, from the computing device via the physical port on the computing device, a second logical port identification communication that identifies a second logical port provided using the physical port on the computing device and a second data traffic type associated with the second networking fabric that is accessible to the processing system via a second networking fabric communication link;
determine that the first networking fabric communication link has become unavailable; and
transmit, in response to determining that the first networking fabric communication link has become unavailable, a first logical port disable communication to the computing device that is configured to cause the computing device to stop transmitting first data traffic having the first data traffic type via the first logical port while continuing to transmit second data traffic having the second data traffic type via the second logical port.

8. The IHS of claim 7, wherein the first data traffic type is provided by one of an Ethernet data traffic type and a Fibre Channel-based data traffic type, and the second data traffic type is provided by the other of the Ethernet data traffic type and the Fibre Channel-based data traffic type.

9. The IHS of claim 7, wherein the first logical port identification communication includes a first Type-Length-Value (TLV) data structure in a first Link Layer Discovery Protocol (LLDP) Protocol Data Unit (PDU) communication that identifies the first logical port and the first data traffic type, and wherein the second logical port identification communication includes a second TLV data structure in a second LLDP PDU communication that identifies the second logical port and the second data traffic.

10. The IHS of claim 9, wherein the first logical port identification communication includes a first options field that indicates an active status for the first logical port, and wherein the second logical port identification communication includes a second options field that indicates an active status for the second logical port.

11. The IHS of claim 7, wherein the first logical port disable communication includes a first Type-Length-Value (TLV) data structure in a first Link Layer Discovery Protocol (LLDP) Protocol Data Unit (PDU) communication with a first options field that indicates that the first logical port should be disabled.

12. The IHS of claim 7, wherein the networking engine is configured to:

determine that the first networking fabric communication link has become available; and
transmit, in response to determining that the first networking fabric communication link has become available, a first logical port enable communication to the computing device that is configured to cause the computing device to begin transmitting the first data traffic having the first data traffic type via the first logical port.

13. The IHS of claim 12, wherein the first logical port enable communication includes a first Type-Length-Value (TLV) data structure in a first Link Layer Discovery Protocol (LLDP) Protocol Data Unit (PDU) communication with a first options field that indicates that the first logical port should be enabled.

14. A method for preserving data traffic streams on at least one of a plurality of logical ports, comprising:
receiving, by a networking device from a computing device via a physical port on the computing device, a first logical port identification communication that identifies a first logical port provided using the physical port on the computing device and a first data traffic type associated with a first networking fabric that is accessible to the processing system via a first networking fabric communication link;
receiving, by the networking device from the computing device via the physical port on the computing device, a second logical port identification communication that identifies a second logical port provided using the physical port on the computing device and a second data traffic type associated with the second networking fabric that is accessible to the processing system via a second networking fabric communication link;
determining, by the networking device, that the first networking fabric communication link has become unavailable; and
transmitting, by the networking device in response to determining that the first networking fabric communication link has become unavailable, a first logical port disable communication to the computing device that is configured to cause the computing device to stop transmitting first data traffic having the first data traffic type via the first logical port while continuing to transmit second data traffic having the second data traffic type via the second logical port.

15. The method of claim 14, wherein the first data traffic type is provided by one of an Ethernet data traffic type and a Fibre Channel-based data traffic type, and the second data traffic type is provided by the other of the Ethernet data traffic type and the Fibre Channel-based data traffic type.

16. The method of claim 15, wherein the first logical port identification communication includes a first Type-Length-Value (TLV) data structure in a first Link Layer Discovery Protocol (LLDP) Protocol Data Unit (PDU) communication that identifies the first logical port and the first data traffic type, and wherein the second logical port identification communication includes a second TLV data structure in a second LLDP PDU communication that identifies the second logical port and the second data traffic.

17. The method of claim 14, wherein the first logical port identification communication includes a first options field that indicates an active status for the first logical port, and wherein the second logical port identification communication includes a second options field that indicates an active status for the second logical port.

18. The method of claim 14, wherein the first logical port disable communication includes a first Type-Length-Value (TLV) data structure in a first Link Layer Discovery Protocol (LLDP) Protocol Data Unit (PDU) communication with a first options field that indicates that the first logical port should be disabled.

19. The method of claim 14, further comprising:

determining, by the networking device, that the first networking fabric communication link has become available; and transmitting, by the networking device in response to determining that the first networking fabric communication link has become available, a first logical port enable communication to the computing device that is configured to cause the computing device to begin transmitting the first data traffic having the first data traffic type via the first logical port.

20. The method of claim 19, wherein the first logical port enable communication includes a first Type-Length-Value (TLV) data structure in a first Link Layer Discovery Protocol (LLDP) Protocol Data Unit (PDU) communication with a first options field that indicates that the first logical port should be enabled.

* * * * *